US007536277B2

(12) United States Patent
Pattipatti et al.

(10) Patent No.: US 7,536,277 B2
(45) Date of Patent: *May 19, 2009

(54) INTELLIGENT MODEL-BASED DIAGNOSTICS FOR SYSTEM MONITORING, DIAGNOSIS AND MAINTENANCE

(75) Inventors: Krishna R. Pattipatti, Storrs, CT (US); Jianhui Luo, Storrs, CT (US); Liu Qiao, Ann Arbor, MI (US); Shunsuke Chigusa, Arlington, MA (US)

(73) Assignees: University of Connecticut, Farmington, CT (US); Toyota Technical Center, U.S.A., Inc., Ann Arbor, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/712,235

(22) Filed: Feb. 28, 2007

(65) Prior Publication Data

US 2008/0004840 A1    Jan. 3, 2008

(51) Int. Cl.
*G06F 3/00* (2006.01)
(52) U.S. Cl. .................. 702/183; 702/179; 702/182; 702/196
(58) Field of Classification Search ............ 702/57, 702/58, 81, 109, 118, 181–188, 179, 196; 324/427; 700/21; 714/33, 37
See application file for complete search history.

(56) References Cited

U.S. PATENT DOCUMENTS 6,757,668 B1    6/2004  Goebel et al.

| 7,016,742 | B2 * | 3/2006 | Jarrell et al. ................ 700/28 |
| 7,218,974 | B2 * | 5/2007 | Rumi et al. ................ 700/28 |
| 7,249,284 | B2 * | 7/2007 | Shah et al. ................ 714/33 |
| 7,260,501 | B2 * | 8/2007 | Pattipatti et al. ............ 702/183 |
| 2003/0184307 | A1 * | 10/2003 | Kozlowski et al. .......... 324/427 |
| 2004/0193958 | A1 * | 9/2004 | Shah et al. ................ 714/37 |
| 2005/0034023 | A1 * | 2/2005 | Maturana et al. .............. 714/37 |

OTHER PUBLICATIONS

Ron J. Patton et al., Issues of Fault Diagnosis for Dynamic, Springer, pp. 16-27, year 1997.*
Isermann, Process Fault Detection Based on Modeling and Estimation Methods-A-Survey, AUTO 20:4-A, pp. 387-404, year 1984.*
Simani, et al. [Editors], Model-Based Fault Diagnosis in Dynamic Systems Using Identification Techniques, Springer, Chapter 2 pp. 19-60, year 2000.*
Ron J. Patton et al., Issues of Fault Diagnosis for Dynamic Systems, Springer, pp. 16-27. Year 1997.

(Continued)

*Primary Examiner*—Eliseo Ramos Feliciano
*Assistant Examiner*—Felix E Suarez
(74) *Attorney, Agent, or Firm*—McCarter & English, LLP

(57) ABSTRACT

Systems and methods are provided for monitoring, diagnosis and condition-based maintenance of mechanical systems. The disclosed systems and methods employ intelligent model-based diagnostic methodologies to effectuate such monitoring, diagnosis and maintenance. According to exemplary embodiments of the present disclosure, the intelligent model-based diagnostic methodologies combine or integrate quantitative (analytical) models and graph-based dependency models to enhance diagnostic performance. The disclosed systems and methods may be employed a wide variety of applications, including automotive, aircraft, power systems, manufacturing systems, chemical processes and systems, transportation systems, and industrial machines/equipment.

21 Claims, 10 Drawing Sheets

OTHER PUBLICATIONS

Struss, et al., Model-Based Tools For the Integration fo Design and Diagnosis Into A Common Process—A Project Report, Working Papers of the 13th International Workshop on Principles of Diagnosis (DX02), Semmering, Austria, 8 pages, 2002.

Isermann, Supervision, Fault-Detection And Fault-Diagnosis Methods—An Introduction, Control Eng. Practice, vol. 5, No. 5, pp. 639-652, 1997.

Frank, Fault Diagnosis in Dynamic Systems Using Analytical and Knowledge-Based Redundancy—A Survey and Some New Results, Automatica, vol. 26, No. 3, pp. 459-474, 1990.

Isermann, Fault Diagnosis of Machines Via Parameter Estimation and Knowledge Processing—Tutorial Paper, Automatica, vol. 29, No. 4, pp. 815-835, 1993.

Isermann, Process Fault Detection Based on Modeling and Estimation Methods—A Survey, AUTO 20:4-A, pp. 387-404. Year 1984.

Simani, et al. [Editors], Model-Based Fault Diagnosis in Dynamic Systems Using Identification Techniques, Springer, Chapter 2, pp. 19-60. Year 2000.

* cited by examiner

Block diagram of hybrid modeling approach

HISTOGRAM OF ESTIMATE OF PARAMETER $D$

HISTOGRAM OF ESTIMATE OF PARAMETER $K$

HISTOGRAM OF ESTIMATE OF PARAMETER $T_i$

HISTOGRAM OF ESTIMATE OF PARAMETER $I$

MULTI-SIGNAL DEPENDENCY MODEL OF ABS
SYSTEM IN TEAMS® TOOL (EXTRACTED FROM THE
D-MATRIX AND THE MATLAB/SIMULINK MODEL)

DIAGNOSTIC TREE OBTAINED FROM TEAMS® TOOL
FOR THE ABS SYSTEM

ABS BRAKING MODEL

TEST DESIGN VIA PARITY EQUATIONS

US 7,536,277 B2

INTELLIGENT MODEL-BASED DIAGNOSTICS FOR SYSTEM MONITORING, DIAGNOSIS AND MAINTENANCE

CROSS REFERENCE TO RELATED APPLICATION

The present application claims the benefit of a co-pending provisional patent application entitled "Intelligent Model-Based Diagnostics for System Monitoring, Diagnosis and Maintenance," which was filed on Apr. 21, 2004 and assigned Ser. No. 60/564,250. The entire content of the foregoing provisional patent application is incorporated herein by reference.

BACKGROUND

1. Technical Field

The present disclosure is directed to systems and methods for monitoring, diagnosis and condition-based maintenance of mechanical systems, and more particularly to systems and methods that employ intelligent model-based diagnostic methodologies to effectuate such monitoring, diagnosis and maintenance. According to exemplary embodiments of the present disclosure, the intelligent model-based diagnostic methodologies advantageously combine or integrate quantitative (analytical) models and graph-based dependency models to enhance diagnostic performance.

2. Background of the Disclosure

Recent advances in sensor technology, remote communication and computational capabilities, and standardized hardware/software interfaces are creating a dramatic shift in the way the health of vehicles is monitored and managed. These advances facilitate remote monitoring, diagnosis and condition-based maintenance of automotive systems. With the increased sophistication of electronic control systems in vehicles, there is a concomitant increased difficulty in the identification of malfunction phenomena. Consequently, current rule-based diagnostic systems are difficult to develop, validate and maintain.

The increasing complexity of modern computer-controlled systems, ranging from automobiles, aircraft, power, manufacturing, chemical processes, transportation, and industrial machines/equipment, has made system monitoring an inevitable component of system operations. For example, with the increased sophistication of electronic control systems in vehicles, there is a concomitant increased difficulty in the identification of the malfunction phenomena (subsystem failure modes, ambiguity caused by cross-subsystem failure propagation) [See, P. Struss et al., "Model-based tools for integration of design and diagnosis into a common process—a project report," 13*th* *International Workshop on Principles of Diagnosis* (DX02), Semmering, Austria, 2002.] Consequently, current rule-based monitoring systems are difficult to develop, validate and maintain.

Recent advances in sensor technology, remote communication and computational capabilities, and standardized hardware/software interfaces are creating a dramatic shift in the way the health of systems is monitored and managed. The availability of data (sensor, command, activity and error code logs) collected during nominal and faulty conditions, coupled with intelligent health management techniques, can help to ensure continuous system operation by recognizing anomalies in system behavior, isolating their root causes, and assisting system operators and maintenance personnel in executing appropriate remedial actions to remove the effects of abnormal behavior from the system. A continuous monitoring and early warning capability that relates detected degradations in systems to accurate remaining life-time predictions are essential to economical operation of systems. Such a capability will minimize downtime, improve resource management via condition-based maintenance, and minimize operational costs.

Automotive engineers have found quantitative simulation to be a vital tool for a variety of functions, including algorithm design for electrical control unit (ECU), rapid prototyping, programming a hardware-in-the-loop (HIL) test system, production code generation and process management documentation. Applications of this model-based design approach include design efforts involving engine control and automatic transmission systems. With the availability of mathematical models and computer-aided engineering information, it is natural to integrate intelligent model-based diagnostic processes into the initial design phase for vehicle health management. Although the basic research in model-based diagnosis has gained increasing attention for over three decades, with different types of approaches developed for this purpose, there has been little attention directed to integrating disparate diagnostic modeling techniques, especially those that combine quantitative and graph-based dependency models, for intelligent diagnosis. Publications addressing model-based diagnostic approaches and techniques include the following:

Silvio Simani et al., *Model-based fault diagnosis in dynamic systems using identification techniques*, Springer Verlag publishers, 2003.

Ron J. Patton et al., *Issues of fault diagnosis for dynamic systems*, Springer Verlag publishers, 2000.

Isermann, R., "Process fault detection based on modeling and estimation methods: a survey," *Automatica*, Vol. 20, pp. 387-404, 1984.

Isermann, R., "Fault diagnosis of machines via parameter estimation and knowledge processing-tutorial paper," *Automatica*, Vol. 29, No. 4, pp. 815-835, 1993.

Isermann, R., "Supervision, fault-detection and fault-diagnosis methods—an introduction," *Control Eng. Practice*, Vol. 5, No. 5, pp. 639-652, 1997.

Paul M. Frank, "Fault diagnosis in dynamic systems using analytical and knowledge-based redundancy—a survey and some new result," *Automatica*, Vol. 26, No. 3, pp. 459-474, 1990.

Despite efforts to date, a need remains for improved/enhanced systems and methods for monitoring, diagnosis and/or maintenance of a variety of systems, including, e.g., automobiles, aircraft, power systems, manufacturing systems, chemical processes and systems, transportation systems, and industrial machines/equipment. In order to facilitate continuous system operation, e.g., by recognizing anomalies in system behavior, isolating their root causes, and assisting system operators and maintenance personnel in executing appropriate remedial actions to remove the effects of abnormal behavior from the system, new intelligent model-based diagnostic methodologies that exploit the advances in sensor, telecommunications, computing and software technologies are needed.

SUMMARY OF THE DISCLOSURE

According to the present disclosure, advantageous hybrid model-based diagnostic methods and systems are described. The disclosed hybrid model-based or intelligent model-based systems, improve a diagnostic system's accuracy and consistency, e.g., relative to conventional systems based solely on a graph-based model. In addition, the hybrid model-based or intelligent model-based methods and systems of the present disclosure exploit existing validated knowledge on rule-based methods, enable rapid remote diagnosis, and respond to the challenge of increased system complexity. While the hybrid/intelligent model-based methods and systems of the present disclosure have particular applicability to automotive diagnosis, the disclosed methods and systems have wide-ranging applicability across a variety of systems and equipment, including automobiles, aircraft, power systems, manufacturing systems, chemical processes and systems, transportation systems, and industrial machines/equipment. Thus, the disclosed methods and systems provide a generic solution to monitoring, diagnosis and maintenance needs, and accordingly have the potential for advantageous application in a wide range of systems.

According to the present disclosure, hybrid model-based techniques that seamlessly employ quantitative (analytical) models and graph-based dependency models for intelligent monitoring, diagnosis and maintenance are described. Automotive engineers have found quantitative simulation (e.g. MATLAB/SIMULINK) to be a vital tool in the development of advanced control systems. The disclosed hybrid method and system exploit this capability to improve a diagnostic system's accuracy and consistency, utilize existing validated knowledge on rule-based methods, enable remote diagnosis, and respond to the challenges of increased system complexity.

In addition, the present disclosure provides a system/method that may be designed so as to facilitate extracting failure cause-effect dependency model(s), which are extracted from behavioral simulation of a system, e.g., a vehicle, under faulty scenarios. Based on the dependency model, a subsystem-resident local agent (ECU-agent) makes local diagnostic/prognostic decisions, while a vehicle-level agent (Diagnostic ECU-agent) will fuse local decisions into a vehicle-level diagnosis. The vehicle-level agent coordinates the local agents, and communicates with a Central Facility (e.g., car dealer shop or manufacturing facility) on the diagnostic/prognostic results and, if necessary, transmits sensor data streams to the Central Facility for further diagnosis by a global agent. The prognostic results can also support car manufacturers in managing the health of a vehicle class (e.g. parts management, model update, recalls). The present disclosure also provides advantageous systems and methods for model-based prognostic techniques and an interacting multiple model approach to model-based prognostics.

The systems and methods of the present disclosure thus effectively respond to and address the increased sophistication of electronic control systems (e.g., in automobiles), an increased level of malfunction phenomena (e.g., subsystem failure modes, ambiguous error codes, etc.) and the inherent difficulty in developing, validating and maintaining current rule-based diagnostic systems. These advantageous results are achieved, at least in part, by providing an intelligent model-based method for fault diagnosis that combines quantitative and graph-based dependency models to develop/provide effective systems and methods to monitor, diagnose and/or maintain systems, equipment and mechanical applications. Additional features and advantageous functionalities associated with the disclosed systems and methods will be apparent from the detailed description which follows.

BRIEF DESCRIPTION OF THE FIGURES

To assist those of ordinary skill in the art in practicing the disclosed systems and methods, reference is made to the appended figures, wherein.

DETAILED DESCRIPTION OF EXEMPLARY EMBODIMENT(S)

Figure 1:
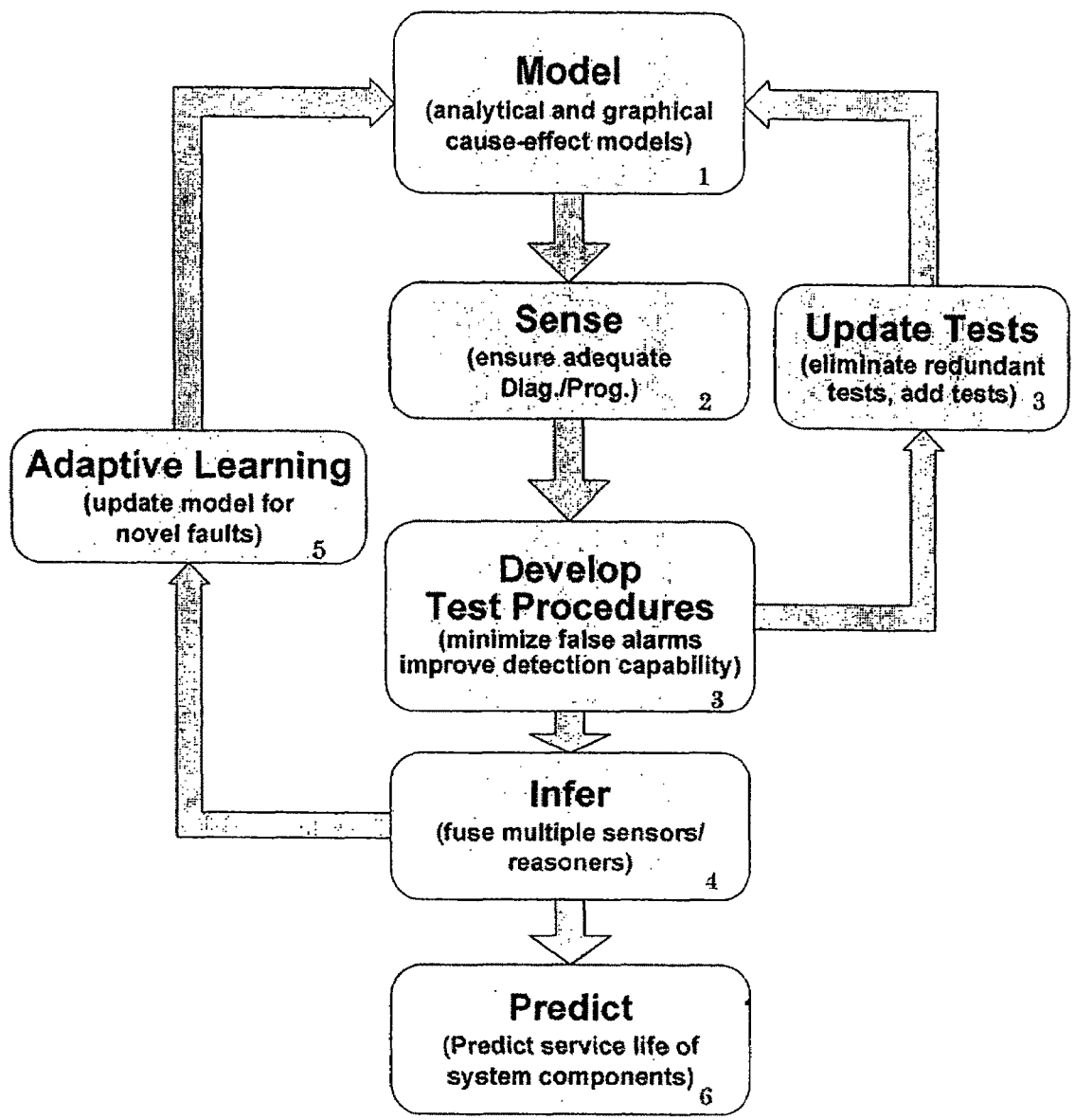
FIG. 1 is a schematic block diagram directed to an exemplary system/method of the present disclosure.

Exemplary embodiments of the disclosed systems and methods are described, at least in part, with reference to the appended figures. Thus, with initial reference to FIG. 1, a block diagram of an exemplary intelligent diagnostic process according to the present disclosure is provided. The process seamlessly employs graph-based dependency models for fault diagnosis and quantitative (analytical) models for test design and fault detection. The process generally contains six major blocks, steps or elements: (i) model, (ii) sense, (iii) develop and update test procedures, (iv) infer, (v) adaptive learning, and (vi) predict. Briefly, these blocks, steps or elements may be described as follows:

Step 1: Model—Use quantitative and graphical cause-effect models to understand fault-to-error characteristics of system components;

Step 2: Sense—Evaluate efficacies of sensors to ensure adequate diagnosis;

Step 3: Develop and Update Test Procedures—Develop smart test procedures to minimize false alarms, while improving detection capability;

Step 4: Infer—Embed test designs and real-time inference algorithm in a real-time operating system;

Step 5: Adaptive Learning—Identify new cause-effect relationships for unmodeled faults; and Step 6: Predict—Lifing algorithms, which interface with onboard usage monitoring systems and parts management databases, are used to predict the useful life-remaining of system components.

Each of the foregoing blocks, steps or elements is described in greater detail herein below with reference to exemplary implementation(s) thereof. According to the exemplary implementation(s) described herein, certain tools and equipment are referenced for use in undertaking and/or completing the disclosed steps and/or providing the disclosed functionality. Although the tools and equipment referenced herein may be advantageously employed according to the disclosed systems and methods, the present disclosure is not limited to the use of such tools/equipment. Rather, alternative and/or substitute tools/equipment may be utilized, as will be readily apparent to persons skilled in the art based on the present disclosure, and the present disclosure expressly encompasses such alternative implementations.

Step 1: Model

According to exemplary embodiments of the present disclosure, the disclosed system or method develops one or more models to understand/address fault-to-error characteristics of system components. Model development is generally achieved through a hybrid modeling technique, which combines quantitative models (simulation models) and graphical cause-effect models in the failure space, through an understanding of the failure modes and their effects, physical/behavioral models, and statistical and learning techniques based on actual failure progression data (e.g., field failure data) as applied to system components.

Figure 2:
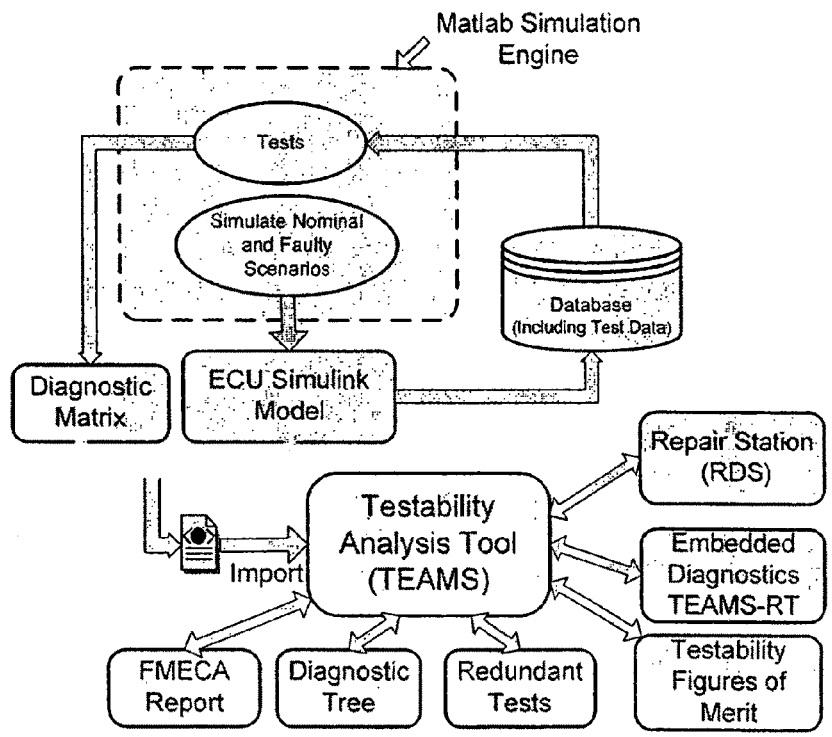
FIG. 2 is a schematic block diagram of an exemplary hybrid modeling approach according to the present disclosure.

FIG. 2 illustrates a block diagram of an exemplary hybrid modeling approach for an automotive system controlled by an electrical control unit (ECU). The quantitative model (which is shown in the upper portion of FIG. 2, i.e., the region above the XML importation element) is assumed to be a representative sample available in the MATLAB/SIMULINK® design environment (The Mathworks, Inc., Natick, Mass.). Using this model, different test implementation schemes, discussed in the next section, are applied to evaluate detection and diagnostic performance. These require extensive simulations (for nominal and faulty scenarios) to extract the relationships between failure causes and observable effects of the system. Information on the system model, such as model parameters, test definition and simulation data, is generally stored in a database.

The cause-effect model, in the form of a Diagnostic Matrix (D-Matrix), is extracted through fault simulations on the quantitative model using tests defined in the model. After the D-matrix is generated, this matrix and other available system information (such as the location of faults) from the MATLAB/SIMULINK® environment are exported in an Extensible Markup Language (XML) format or other suitable format. XML is a flexible text format and is increasingly playing a significant role in the exchange of a wide variety of data on the Web and among many different modeling environments.

The XML file is imported into a diagnostic analysis tool (such as TEAMS®) to layer in the cause-effect dependencies on a structural model (as shown in the exemplary system schematic of FIG. 2). [See, e.g., Sen et al., "Simulation-based testability analysis and fault diagnosis," *AUTOTESTCON* '96, pp. 136-148, 1996.] The lower portion of FIG. 2 (i.e., the region into which the XML file is imported) may be referred to as the "Graphical Dependency Model" and is effectively combined with the quantitative model according to the present disclosure. Multi-signal dependency modeling may be employed in order to maintain conformity with the physical structure of the system. This modeling technique has the benefit of capturing the useful and important knowledge about the system for fault diagnosis without unnecessary details. Multi-signal dependency modeling has been used for the testability analysis of large systems, containing as many as 50,000 faults and 45,000 tests. Detailed information about multi-signal modeling can be found in the foregoing publication to Sen et al.

The functions of testability analysis include computing percent fault detection and isolation measures, identifying redundant tests and ambiguity groups, and generating updated Failure Modes Effects and Criticality Analysis (FMECA) report and diagnostic tree. According to an exemplary embodiment of the present disclosure, the testability analysis tool also exports the D-matrix, the test code and structural information to one or more real-time inference algorithms for on-board, real-time diagnosis. The onboard diagnostic data is downloaded to one or more remote diagnosis servers for interactive diagnosis (by driving interactive electronic technical manuals), diagnostic/maintenance data management, logging and trending. Of note, the remote diagnostic server(s) can also be integrated with the supply-chain systems and logistics databases for company-wide vehicle health management.

Step 2: Sense

According to the present disclosure, the sensor suite is typically designed for vehicle control and performance. The efficacies of these sensors are systematically evaluated and quantified to ensure that adequate diagnosis and prognosis are achievable. If the existing sensor fusion is not appropriate for diagnosis/prognosis, use of additional sensors and/or analytical redundancy is generally considered without impacting vehicle control and performance. According to exemplary embodiments of the present disclosure, a testability analysis tool can be used to compare and evaluate alternative sensor placement schemes.

Step 3: Develop and Update Test Procedures

Smart test procedures that detect failures, or onsets thereof, have to be developed. These procedures have to be carefully tuned to minimize false alarms, while improving their detection capability (power of the test). The procedures should have the capability to detect trends and degradation, and assess the severity of a failure for early warning. Exemplary quantitative model-based test design schemes for use in developing such procedures are discussed in greater detail below.

Step 4: Adaptive Learning

If the observed fault signature does not correspond to faults modeled in the graphical dependency model, system identification techniques are invoked to identify new cause-effect relationships, to update the D-matrix and to layer in this information onto a multi-signal dependency model.

Step 5: Infer

An integrated on-board and off-board reasoning system capable of fusing results from multiple sensors/reasoners and driver (or "driver model") to evaluate the health of a vehicle needs to be applied. This reasoning engine and the test procedures are advantageously compact enough so that they can be embedded in the electrical control unit and/or a diagnostic maintenance computer. In the disclosed approach, the test code and real-time inference algorithms (such as TEAMS-RT®) are embedded in a real-time operating system to process the sensor data and to provide inference results. If onboard diagnostic data is downloaded to a repair station, a remote diagnostice server may be used to provide assistance to repair personnel in rapidly identifying replaceable component(s).

Step 6: Predict

Lifing algorithms, which interface with onboard usage monitoring systems and parts management databases, may be used to predict the useful life remaining of system components.

To further assist those of ordinary skill in the relevant art in making and using the disclosed systems and methods, additional disclosure is provided herein, with particular focus on Step 3 (Develop and Update Test Procedures) and an exemplary application of Steps 1, 2, 3 and 5 for an anti-lock braking system. As noted above, the systems and methods of the present disclosure have wide ranging applicability, and are not limited to the anti-locking breaking system described below.

Exemplary Test Design and Generation of Graphical Dependency Model

1. Test Design via Parity Equations and Parameter Estimation

A key assumption of quantitative model-based techniques is that a mathematical model is available to describe the system. Although this approach is complex and needs more computing power, several advantages make it very attractive. The mathematical models are used to estimate the needed variables for analytical redundancy. With the mathematical model, a properly designed detection and diagnostic scheme can be not only robust to unknown system disturbances and noise, but also can estimate the fault size at an early stage. [See, Isermann, R., "Process fault detection based on modeling and estimation methods: a survey," *Automatica*, Vol. 20, pp. 387-404, 1984; Isermann, R., "Fault diagnosis of machines via parameter estimation and knowledge processing-tutorial paper," *Automatica*, Vol. 29, No. 4, pp. 815-835, 1993.] The major techniques for quantitative model-based test design include parameter estimation, parity relations, observers and signal-analysis [Patton et al., *Issues of fault diagnosis for dynamic systems*, Springer Verlag publishers, 2000]. The following discussion focuses on parity equation and parameter estimation-based approaches.

i. Parity (Residual) Equations

Parity relations are rearranged forms of the input-output or state-space models of the system. [Isermann, R., "Supervision, fault-detection and fault-diagnosis methods—an introduction," *Control Eng. Practice*, Vol. 5, No. 5, pp. 639-652, 1997.] The essential characteristic of this approach is to check for consistency of the inputs and outputs. Under normal operating conditions, the magnitudes of residuals or the values of parity relations are small. To enhance residual-based fault isolation, directional, diagonal and structured residual design schemes are proposed [Gertler et al., "Generating directional residuals with dynamic parity relations," *Automatica*, Vol. 33, No. 4, pp. 627-635, 1995.]. In the directional residual scheme, the response to each single fault is confined to a straight line in the residual space. Directional residuals support fault isolation, if the response directions are independent. In the diagonal scheme, each element of the residual vector responds to only one fault. Diagonal residuals are ideal for the isolation of multiple faults, but it can only handle r faults, where r equals the number of outputs [J. Gertler, "Fault detection and isolation using parity relations," *Control Eng. Practice*, Vol. 5, No. 5, pp. 1385-1392, 1995]. Structured residuals are designed to respond to different subsets of faults and are insensitive to others not in each subset.

The directional residual design has been demonstrated on a linear discrete-time model of an automotive engine [19]. In the context of diagnosing faults in an automotive engine, Krishnaswami et. al. [21] employ a Nonlinear AutoRegressive Moving Average modeling with eXogenous inputs (NARMAX) technique for system identification in order to implement Nonlinear Parity Equation Residual Generation (NPERG) scheme. The nonlinear parity generation method [17] and parameter estimation methods (based on an ARMA model) are used to detect and isolate process coefficient faults in electronic throttle control systems. Borner et. al. [22] use parity equations, based on a discrete ARMA model, to detect sensor faults of vehicle suspension systems. Parity equations require less computational effort, but do not provide as much insight into the process as parameter estimation schemes.

ii. Parameter Identification Approach

The parameter estimation-based method [5, 6] not only detects and isolates a fault, but also may estimate its size. A key requirement of the parameter estimation-based method is that the mathematical model should be identified and validated so that it expresses the physical laws of the system as accurately as possible. If the nominal parameters $\underline{\theta}_0$ are not known exactly, they need to be estimated from observed data. Two different parameter identification approaches are known for this purpose.

iii. Equation Error Methods

Equation error methods use the fact that faults in dynamic systems are reflected in the physical parameters, such as the friction, mass, inertia, resistance and so on. Isermann [6] has presented a five-step parameter estimation method for general systems.

(1) Obtain a theoretical model of the system relating the measurable input and output variables:

$$\underline{y}(t) = f\{\underline{u}(t), \underline{\theta}_0\} \quad (1)$$

(2) Determine the relationship between the model parameters $\underline{\theta}$ and the physical system coefficients $\underline{p}$: $\underline{\theta} = g(\underline{p})$.

(3) Identify the model parameter vector $\underline{\theta}$ from the measured variables $\underline{Y}^N = \{\underline{y}(k): 0 \leq k \leq N\}$ and $\underline{U}^N = \{\underline{u}(k): 0 \leq k \leq N\}$.

(4) Calculate the system coefficients (parameters): $\underline{p} = g^{-1}(\underline{\theta})$ and deviations from nominal coefficients, $\underline{p}_0 = g^{-1}(\underline{\theta}_0)$, viz., $\Delta \underline{p} = \underline{p} - \underline{p}_0$.

(5) Diagnose faults by using the relationship between system faults and deviations in the coefficients $\Delta \underline{p}$.

As an illustration of an application of an equation error method, in step (1), a linearized model with lumped parameters may be used, such as the following single-input single-output (SISO) differential equation:

$$a_n y^{(n)}(t) + \ldots + a_1 \dot{y}(t) + y(t) = b_0 u(t) + \ldots + b_m u^{(m)}(t) \quad (2)$$

where the superscript notation means the time derivatives of the input and output. The system parameters are $\underline{\theta}^T = [a_1, a_2, \ldots, a_n | b_0, b_1, \ldots, b_m]$. Consequently, $$y(k) = \underline{\psi}^T(k) \underline{\theta} + e(k) \text{ for } 0 \leq k \leq N \quad (3)$$

where $\underline{\psi}^T(k) = [-\dot{y}(k), -\ddot{y}(k), \ldots, -y^{(n)}(k), u(k), \dot{u}(k), \ldots, u^{(m)}(k)]$ and e(k) represents equation error. The estimate of the parameter vector is computed via the following recursive least-squares (RLS) equations:

$$\hat{\underline{\theta}}(k+1) = \hat{\underline{\theta}}(k) + \underline{\alpha}(k)\left[y(k+1) - \underline{\psi}^T(k+1)\hat{\underline{\theta}}(k)\right] \quad (4)$$

$$\underline{\alpha}(k) = \frac{1}{\underline{\psi}^T(k+1)P(k)\underline{\psi}(k+1) + 1} P(k)\underline{\psi}(k+1)$$

$$P(k+1) = [I - \underline{\alpha}(k)\underline{\psi}^T(k+1)]P(k)$$

Of note, the least-squares parameter estimation requires the time derivatives of the noisy input and output variables up to the $m^{th}$ and the $(n-1)^{th}$ order, respectively. The estimation of these time derivatives poses a significant numerical challenge. The use of "state variable filtering" (SVF) on both the input and output variables is suggested by Young [24]. However, as Isermann [5] pointed out, the remaining noise restricts the application of the method to second and third order systems only.

Takajir Umeno et al. [24] used recursive least-squares to estimate the tire pressure for diagnosis based on the equation-error method. The tire is modeled by linear state space equations. The equation error method (modeled by (2)) was also applied to fault diagnosis in an electromechanical automotive throttle valve actuator [23].

iv. Output Error (Prediction-error) Methods

For a multiple input-multiple output (MIMO) system, it may be assumed that a batch of data has been collected from the system:

$$Z^N = [\underline{v}(1), \underline{u}(1), \underline{v}(2), \underline{u}(2), \ldots, \underline{v}(N), \underline{u}(N)] \quad (5)$$

The output error provided by a certain model, parameterized by $\underline{\theta}$, may be given by $$\underline{e}(k, \underline{\theta}) = \underline{v}(k) - \hat{\underline{v}}(k|\underline{\theta}) \quad (6)$$

The output-error sequence in (6) may be filtered through a stable filter L and the filtered output may be $\underline{e}_F(k, \underline{\theta})$. The estimate $\hat{\underline{\theta}}_N$ is then computed via $$\hat{\underline{\theta}}_N = \arg\min_{\underline{\theta}} V_N(\underline{\theta}, Z^N) \quad (7)$$

where $$V_N(\underline{\theta}, \underline{Z}^N) = \frac{1}{N} \sum_{k=1}^{N} \underline{e}_F^T(k, \underline{\theta}) \Sigma^{-1} \underline{e}_F(k, \underline{\theta}) \quad (8)$$

where $\Sigma$ is the covariance of error vector. The effect of filter L is akin to frequency weighting [25]. For example, a low-pass filter can suppress high-frequency disturbances. The minimization of (8) is carried out iteratively. The estimated covariance matrix and the updated parameter estimates at iteration i are $$\hat{\Sigma}_N^{(i)} = \frac{1}{N-1} \sum_{k=1}^{N} \underline{e}_F(k, \underline{\theta}_N^{(i)}) \underline{e}_F^T(k, \underline{\theta}_N^{(i)}) \quad (9)$$

$$\hat{\underline{\theta}}_N^{(i+1)} = \arg\min_{\underline{\theta}} \frac{1}{N} \sum_{k=1}^{N} \underline{e}_F^T(k, \underline{\theta}) [\hat{\Sigma}_N^{(i)}]^{-1} \underline{e}_F(k, \underline{\theta})$$

Analogous to the RLS equation (4), a recursive version for the output-error methods can be derived. In general, the function $V_N(\underline{\theta}, Z^N)$ cannot be minimized by analytical methods; the solution is obtained iteratively. The computational effort of this method is significantly larger and on-line real-time application may not achievable. However, this approach provides more accurate parameter estimates than the equation error method, as is illustrated below.

2. Generation of D-matrix

The results of parity equations and parameter estimation methods provide error codes for fault detection that can be embedded in a parametric diagnostic Dictionary matrix (D-matrix). The D-Matrix $D=\{d_{ij}\}$ provides detection information, where $d_{ij}$ is 1 if test $t_j$ detects a failure state $s_i$. Table I shows an example of a D-matrix according to the present disclosure. In this example, the faults are parametric faults and tests are designed using parity equations and parameter estimation techniques. The D-matrix summarizes the diagnostic information of the system and diagnostic analysis is performed using this matrix.

TABLE I

Example of Diagnostic Matrix

| States | $t_1$ | $t_2$ | $t_3$ | $t_4$ | $t_5$ |
|---|---|---|---|---|---|
| $S_1$ | 1 | 0 | 0 | 0 | 0 |
| $S_2$ | 0 | 1 | 1 | 0 | 0 |
| $S_3$ | 0 | 1 | 0 | 1 | 0 |
| $S_4$ | 0 | 1 | 0 | 0 | 1 |
| $S_5$ | 0 | 1 | 1 | 0 | 1 |

From the D-matrix, a multi-signal model of the system may be extracted. In an exemplary approach according to the present disclosure, the multi-signal model is based on the premise that a fault will cause changes in certain physical parameters, which, in turn, will cause changes in the process parameters. Consequently, by monitoring the changes in the process parameters, one can detect and isolate the faults in physical parameters. In the multi-signal dependency model, the failure sources are typically the component faults (i.e., physical failure modes), and the signals associated with the failure modes are typically the process parameter changes, directions of change and the sequence of their occurrences. Thus, each test (parity equation or parameter estimation method) detects certain subset(s) of signals in the multi-signal model.

Decision fusion algorithms for diagnosis of causes are implemented through a model-based reasoning approach, wherein information about failure sources (causes) and tests (events) are captured in a directed graph model based on the D-matrix. The objective of the inference engine is to associate one of four distinct failure states with each component in the system: good, bad, suspected and unknown. Initially, the system/method can be implemented so as to assume that the states of all components are unknown. The components covered by passed tests are categorized as good and those covered by failed tests excluding those known good components are treated as suspected components. The bad components are derived from these suspected components by the model-based reasoning engine. For example, if the tests $t_2$ and $t_3$ failed while all other tests passed, then the unique diagnostic result would be $s_2$. In the case of an asymmetric test, the detection probability may not be binary ($d_{ij} \neq 0$ or 1). Efficient decision fusion algorithms that consider asymmetric binary tests have been developed for real-time multiple fault diagnosis of systems with as many as 10,000 failure modes [28].

Demonstration of the Hybrid Design Process

Figure 9:
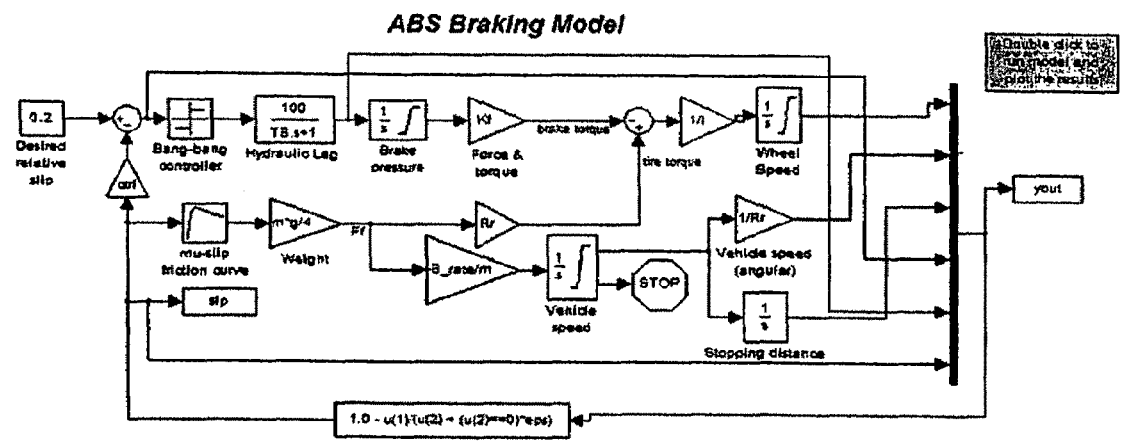
FIG. 9 is an ABS braking model according to an exemplary embodiment of the present disclosure.

As shown in FIG. 9, the anti-lock braking system model is utilized as an exemplary case study of the diagnostic design process of the present disclosure, i.e., to demonstrate the advantageous hybrid design process of the present disclosure. In this exemplary case study, ABS is implemented in automobiles to ensure optimal vehicle control and minimal stopping distances during hard or emergency braking. The simplified model of an ABS system shown in FIG. 9 is adopted from MATLAB/SIMULINK® examples from The Mathworks [14]. Of note, in an exemplary embodiment of the present disclosure, the model provided by The Mathworks program may be modified to use a hyperolic tangent (tan h function), rather than using a Bangbang controller (sign function), to avoid or minimize chattering behavior. In addition, measurement noises may be added to the model. The nonlinear Bangbang controller in this model is implemented using the estimated slip. In this exemplary study, two model-based test design methods, viz., parity equations and parameter estimation methods, are combined to detect and isolate parametric faults of the ABS system.

Figure 10:
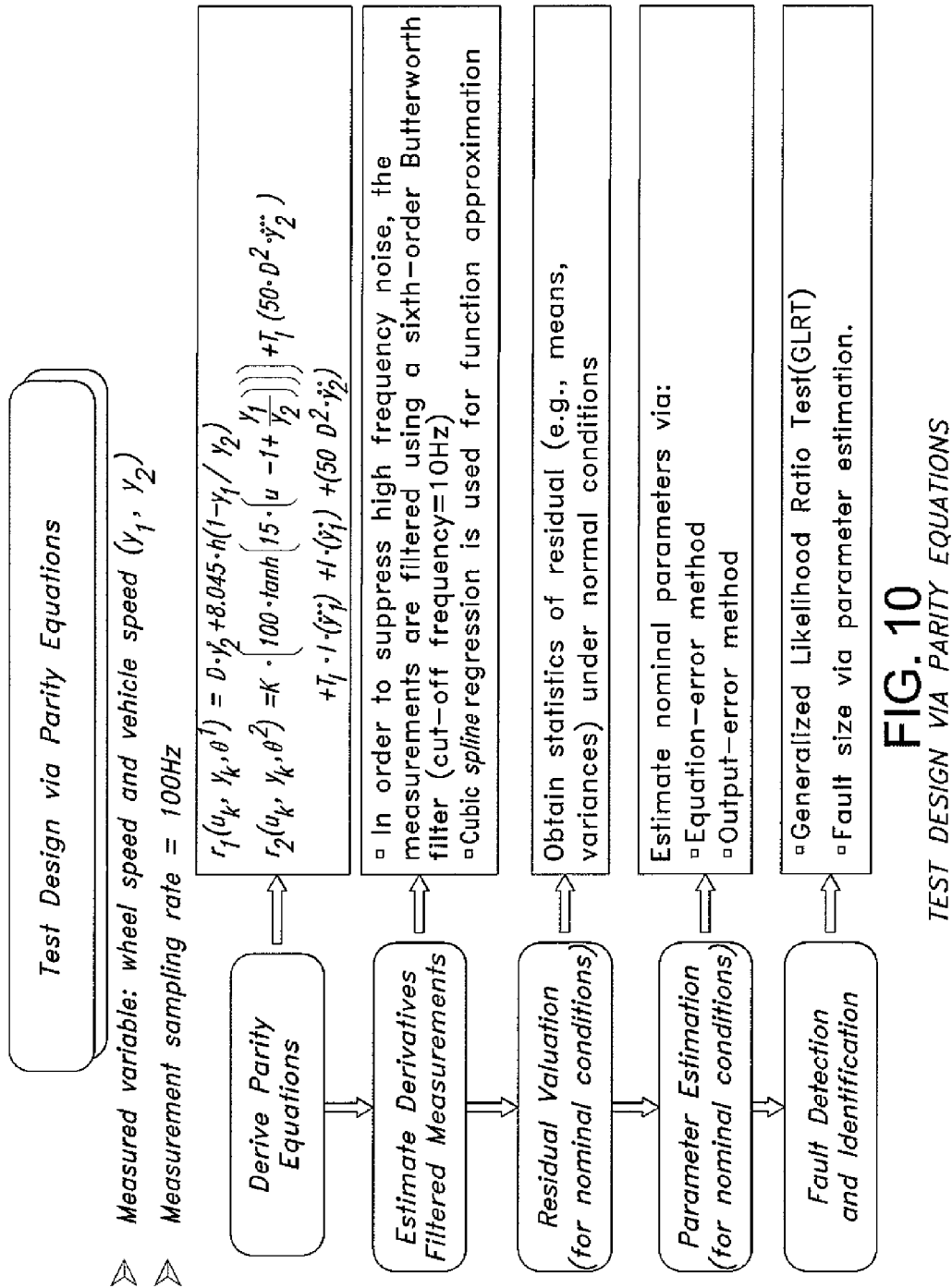
FIG. 10 is a schematic block diagram associated with an exemplary test design via parity equations according to an exemplary embodiment of the present disclosure.

With reference to FIG. 10, an exemplary flow chart showing a test design using parity equations is provided. As shown therein, the measured variables are wheel speed and vehicle speed, and the measurement sampling rate was 100 Hz. As further shown in the flow chart of FIG. 10, the operative steps include: (i) derive parity equations, (ii) estimate derivatives/filtered measurements, (iii) residual evaluation (for nominal conditions), (iv) parameter estimation (for nominal conditions), and (v) fault detection and identification. Additional details concerning these operative steps are provided herein below.

1. Generation of Continuous-Time Parity Functions

Parity functions provide a proper check of the parity (consistency) of the measurements (input and output) acquired from the monitored system. To derive the parity functions, the nominal nonlinear state space model of the ABS system is written in the following form:

$$\dot{x}_1 = \frac{1}{I} \cdot \left(\frac{mg}{4} h\left(1 - \frac{x_1}{x_2}\right) \cdot D - x_3\right) \tag{10}$$

$$\dot{x}_2 = \frac{-g}{4D} \cdot h\left(1 - \frac{x_1}{x_2}\right)$$

$$\dot{x}_3 = x_4$$

$$\dot{x}_4 = \frac{100K}{T_l} \tanh\left(15 \cdot \left(u - 1 + \frac{x_1}{x_2}\right)\right) - \frac{1}{T_l} x_3$$

$$\begin{bmatrix} y_1 \\ y_2 \end{bmatrix} = \begin{bmatrix} 1 & 0 & 0 & 0 \\ 0 & 1 & 0 & 0 \end{bmatrix} \begin{bmatrix} x_1 \\ x_2 \\ x_3 \\ x_4 \end{bmatrix} + \begin{bmatrix} v_1 \\ v_2 \end{bmatrix} \tag{11}$$

where
$x_1$: wheel speed,
$x_2$: zehicle speed,
$x_3$: brake torque,
$x_4$: hydraulic output
g: acceleration of gravity
m: vehicle mass
D: wheel diameter
K: coeffcient related to piston area
$T_l$: hydraulic lag time
I: vehicle intertia
h: a static look up table for friction coefficient
$v_1, v_2$: measurement noise The vehicle mass is assumed to be known. The first two states are the measured variables. The measurements are obtained at a sampling rate of 100 Hz. In equation (10), the original function for $\dot{x}_4$ is a sign function. However, the sign function is non-smooth [2] and does not possess derivatives (the first derivative of sign function is a delta function). This causes significant numerical difficulties. In addition, it results in chattering behavior in the output. To overcome this problem, the sign function is replaced by tan h, a smooth differentiable function.

Algorithms to automatically generate the parity equations (residual functions) have been developed for Differential Algebraic Equations (DAE) [11]. Since the exemplary ABS system model is nonlinear and does not follow the DAE format, the residual functions must be derived manually. The first residual function is obtained directly from the state equation for $x_2$. The second residual function is obtained by eliminating the states $x_3$ and $x_4$ in (10). The two residual functions are:

$$r_1(u_k, y_k, \theta^1) = D \cdot \dot{y}_2 + 8.045 \cdot h(1 - y_1/y_2) \tag{12}$$

$$r_2(u_k, y_k, \theta^2) = K \cdot \left(100 \cdot \tanh\left(15 \cdot \left(u - 1 + \frac{y_1}{y_2}\right)\right)\right) + \tag{13}$$
$$T_l(50 \cdot D^2 \cdot \dddot{y}_2) + T_l \cdot I \cdot (\dddot{y}_1) + I \cdot (\ddot{y}_1) + (50 \cdot D^2 \cdot \dot{y}_2)$$

where the system parameters are as follows: $\theta^1=(D)$, $\underline{\theta}^2=(K\ T_l\ I)^T$. Consequently, $\underline{\theta}=(D\ K\ T_l\ I)^T$ 2. Residual Evaluation and Parameter Estimation for Nominal Conditions The ABS system described in (10) and (11) is simulated in MATLAB/SIMULINK® examples. The nominal values of the model parameters are: D=1.25, K=1, $T_l$=0.01, I=5. The input variable (desired relative slip) u=0.2. The output noise processes $v_1, v_2$ are white with standard deviations of 0.2 each.

The discrete-time residual functions require the estimation of time-derivatives of sampled data. In order to suppress high frequency noise, which may corrupt the estimation of time derivatives, the measurement y(k) is first filtered with a sixth-order Butterworth filter with a cut-off frequency of 10 Hz. The cut-off frequency is determined from the largest eigen-frequency of measurements (in our case, the frequency of $y_1$). One way to estimate the value of the derivative of the filtered signal is to find a least-squares polynomial fit approximation to a set of consecutive samples [9]. The main disadvantage of this method is that the estimated curve may be unstable and may oscillate in some regions due to the nature of polynomials, especially when higher-order polynomials are fitted [11]. Spline regression is suggested to overcome this problem. Spline regression fits the model by piecewise polynomials with smooth constraints at the knots. According to an exemplary embodiment of the present disclosure, cubic spline approximation is applied to the filtered signals and to estimate the derivatives of the measurements based on the spline coefficients. The Matlab function spline is used to perform function approximation.

Figure 3:
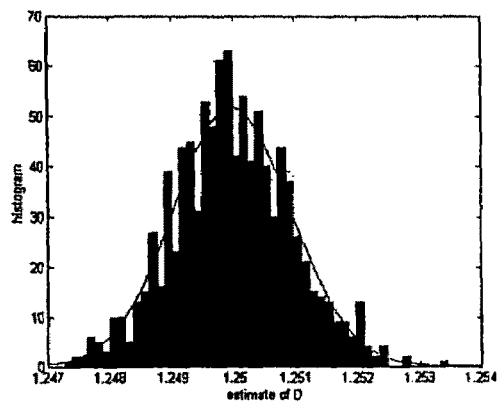
FIGS. 3-6 are histogram plots associated with estimated values for nominal conditions for the parameters D, K T$_1$ and I, respectively, according to an exemplary embodiment of the present disclosure.

Equation (12) can be written in the form of (3). Thus, the nominal value of $\theta^1=(D)$ can be identified by linear least-squares estimation by minimizing $$\sum_{i=1}^{N} \|r_1(u_i, y_i \theta^1)\|^2,$$

where N=1,250. The estimated $\hat{D}$ is used as a known parameter in equation (13). FIG. 3 shows a histogram of estimated $\hat{D}$, obtained from 1000 Monte Carlo runs. It can be seen that the histogram is nearly Gaussian. A normal distribution is fitted to the estimated $\hat{D}$ and the obtained distribution for $\hat{D}$ is $\hat{D} \sim N(1.2499, 9.096 \times 10^{-7})$. Here $N(\mu, \sigma^2)$ denotes a Gaussian distribution with mean $\mu$ and variance $\sigma^2$.

Equation (13) is a nonlinear function (actually it is bilinear) of $\underline{\theta}^2$. Thus, the nominal values of $\underline{\theta}^2 = (K \; T_l \; I)^T$ are identified by nonlinear least-squares by minimizing $$\sum_{i=1}^{N} \|r_2(u_i, y_i \theta^1)\|^2.$$

The Matlab nonlinear least-squares routine lsqnonlin is used to minimize the function. This iterative algorithm is a subspace trust region method and is based on the interior-reflective Newton method. Unfortunately, according to the exemplary case study described herein, satisfactory results were not obtained from this recursive algorithm; the estimates of $\underline{\theta}^2$ are biased. The reasons for this are the nonlinearity of the model and the presence of noise at the output of the system. Zhang et. al. [10] also had a similar problem with this approach.

Figure 4:
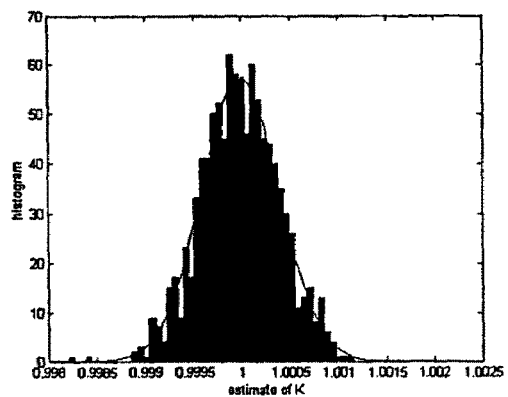
Figure 5:
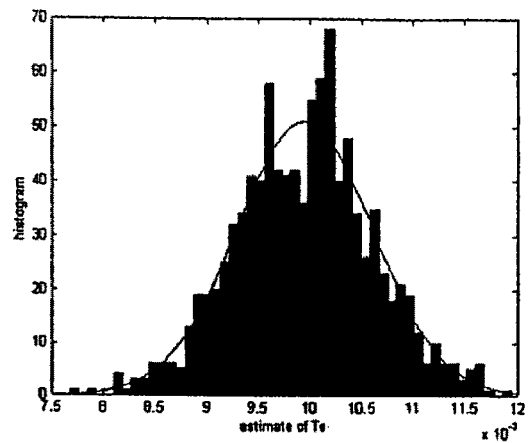
Figure 6:
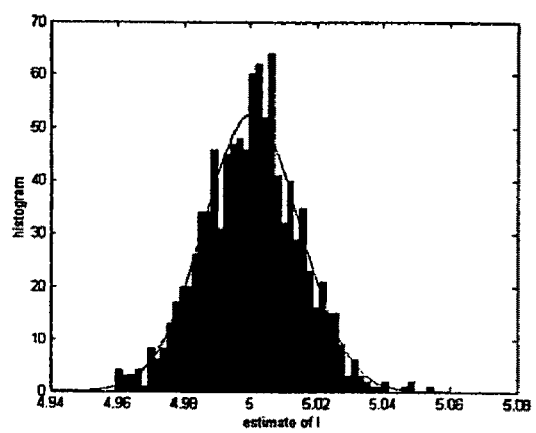

When the equation-error method (using residual function) does not work well, the output error-based parameter estimation method may be advantageously employed. Since the exemplary ABS system disclosed herein is nonlinear, each iteration of the algorithm requires a simulation of the system to obtain the output $\underline{Z}^N$. This will require significantly more computations than the equation error method. FIGS. 4-6 show the histograms of estimates of K, $T_l$ and I, respectively. It can be seen that the histograms are nearly Gaussian and their distributions are K~N(0.9999, 16587×10$^{-7}$), $T_l$~N(0.009948, 4.4486×10$^{-7}$) and I~N(5.0005, 2.0984×10$^4$), respectively.

3. Fault Detection

Fault detection is performed by a local approach based on a specific assumption: the parametric faults are small [10]. The key idea of this approach is to test the statistics of residual (residual test) to see if it is beyond a user-defined threshold. According to exemplary embodiments of the present disclosure, the residual tests are performed first to detect parametric faults. If only one parameter is in the residual function (such as residual $r_1$), it can also isolate the parametric fault. Otherwise, other statistical tests (such as the minmax test and/or a sensitivity test [9]), coupled with parameter estimation methods, may be used after the application of the residual test to isolate the fault. In addition, parameter estimation methods may also be used to identify the fault size. According to the exemplary embodiment described herein, the residual test is used for fault detection and parameter estimation for fault size estimation. However, the present disclosure is not limited to the use of such tests and/or estimation techniques.

An exemplary procedure for a residual test by a local approach is summarized by the following steps:

Step 1: Monto-Carlo simulations (M runs)
 FOR i=1, 2, ..., M DO
  (a) Compute $$P(\underline{u}_k, \underline{y}_k, \theta_0) = \tag{14}$$

$$\frac{1}{2}\frac{\partial}{\partial \underline{\theta}}(r^T(\underline{u}_k, \underline{y}_k, \theta_0)r(\underline{u}_k, \underline{y}_k, \theta_0)) = \left(\frac{\partial r(\underline{u}_k, \underline{y}_k, \theta_0)}{\partial \underline{\theta}}\right)^T r(\underline{u}_k, \underline{y}_k, \theta_0)$$

where $r(\underline{u}_k, \underline{y}_k, \theta_0)$ is the residual function defined in (12) and (13).

(b) Compute the normalized residual defined as $$\underline{\zeta}_i(\theta_0) = \frac{1}{\sqrt{N}}\sum_{k=1}^{N} P(\underline{u}_k, \underline{y}_k, \theta_0) \tag{15}$$

END DO

Step 2: Estimate the nominal bias and covariance $$\hat{\underline{p}}_0 = \frac{1}{M}\sum_{i=1}^{M} \underline{\zeta}_i(\theta_0) \tag{16}$$

$$\hat{\Sigma}_0 = \frac{1}{M-1}\sum_{i=1}^{M} (\underline{\zeta}_i(\theta_0) - \hat{\underline{p}}_0)(\underline{\zeta}_i(\theta_0) - \hat{\underline{p}}_0)^T$$

Step 3: Use the generalized likelihood ratio test (GLRT) for detecting unknown changes in the mean of a Gaussian vector (also known as $\chi^2$-test). The hypothesis test is described as follows.

Let $\theta_0$ be the nominal parameter for a system. Given an N samples of input-output data $Y^N=\{\underline{y}(k): 0 \leq k \leq N\}$ and $U^N=\{\underline{u}(k): 0 \leq k \leq N\}$, decide between the two hypotheses $$H_0: \theta = \theta_0 \text{ and } H_1: \theta = \theta_0 + \frac{\mu}{\sqrt{N}},$$

where $\underline{\mu} \neq 0$ is an unknown vector with the same dimension as $\theta_0$.

For each new measurement, compute the $\underline{P}(\underline{u}_k, \underline{y}_k, \theta)$ and the normalized residual $\underline{\zeta}(\theta)$. The test decision is performed using the following rule:

$$\chi^2_{global} = (\underline{\zeta}(\theta) - \hat{\underline{p}}_0)^T \hat{\Sigma}_0^{-1} (\underline{\zeta}(\theta) - \hat{\underline{p}}_0) \tag{17}$$

$$\chi^2_{global} \leq \lambda \rightarrow \text{no fault,}$$

$$\chi^2_{global} > \lambda \rightarrow \text{fault.}$$

The threshold $\lambda$ is chosen to satisfy the desired false alarm probability.

Steps 1 and 2 are first performed to estimate the nominal bias and covariance. 1000 Monte-Carlo runs are performed with different random noise realizations under normal conditions. Then the GLRT (17) is applied to data simulated with the nominal model and to data simulated with the modified parameter $\underline{\theta}$. For each parametric fault, a total of 100 simulations are performed with different random noise realizations. The sample size for each simulation is N=1,250. Tables II and III summarize the results for these tests on residuals $r_1$ and $r_2$, where the empirical means and standard deviations are compared with the theoretical values. A $\chi^2$-distribution, with n degrees of freedom has mean value n and standard deviation $\sigma = \sqrt{2n}$. In our example, n=dim($\underline{\theta}$)=1, and 3 for residuals $r_1$ and $r_2$, respectively.

Parametric faults with a 5% change from their nominal values are simulated for each fault. F1-F4 are single parameter faults and F5 is a two parameter fault. Tables II-III show that, under nominal conditions, the GLRT has approximately a central $\chi^2$ distribution, while in the presence of a fault, empirical means shift from theoretical mean significantly. According to the $\chi^2$-table, the thresholds corresponding to a false alarm probability of 0.05 are $\lambda_1=3.84$ for parameter $\theta^1=D$, and $\lambda_2=7.82$ for parameters $\underline{\theta}^2=(K\ T_l\ I)^T$. It is evident that these four parametric faults can be successfully detected.

TABLE II

Fault detection by GLRT for $\theta_0^1$

|  | $\theta_0^1$ | $\theta_1^1$ (F1) |
|---|---|---|
| D | 1.25 | 1.31 |
| Empirical Mean | 0.92 | 171.98 |
| Empirical std. | 1.15 | 26.48 |
| Theoretical mean | 1 | — |
| Theoretical std. | 1.41 | — |

TABLE III

Fault detection by GLRT for $\theta_0^2$

|  | $\theta_0^2$ | $\theta_1^2$ (F2) | $\theta_2^2$ (F3) | $\theta_3^2$ (F4) | $\theta_4^2$ (F5) |
|---|---|---|---|---|---|
| K | 1.00 | 1.05 | 1.00 | 1.02 | 1.05 |
| $T_l$ | 0.01 | 0.01 | 0.0105 | 0.01 | 0.01 |
| I | 5.00 | 5.00 | 5.00 | 5.25 | 5.25 |
| Empirical Mean | 2.92 | 30.34 | 50.45 | 133.68 | 140.96 |
| Empirical std. | 2.31 | 12.47 | 18.56 | 22.76 | 24.84 |
| Theoretical mean | 3 | — | — | — | — |
| Theoretical std. | 2.45 | — | — | — | — |

After fault detection is performed, parameter estimation is used to identify the changes in the parameters. The linear least-squares (equation error-method) and nonlinear least squares (output error-method) are used for parameter $\theta^1$ and $\theta^2$, respectively. Normal distributions are fitted to the estimated $\theta^1$ and $\underline{\theta}^2$. The estimated values for D, K, $T_l$ and I (for F1-F4) are D~N(1.3098,1.011×10$^{-6}$), K~N(1.0496,0.237× 10$^{-6}$), $T_l$~N(0.01046,0.707×10$^{-6}$) and I~N(5.248,0.528× 10$^{-6}$), respectively. The estimated value for K and I for F5 are K~N(1.0495,0.032×10$^{-5}$) and I~N(5.247,0.0354×10$^{-5}$). Hypothesis tests (H$_0$:θ=θ$_0$, H$_1$:θ=θ*) based on the likelihood ratio are performed for each parameter to identify which parameters have changed when the fault is detected. It can be seen that all five parametric faults can be isolated and estimated accurately.

4. Analysis with an Additional Sensor

As discussed above, the equation-error-based parameter estimation method for the second residual does not provide satisfactory estimation results due to the measurement noise, and requires more computational effort than that for the first residual (using linear least-squares). Accordingly, the inclusion of an additional sensor may serve to improve fault detection and isolation significantly.

Addition of an additional sensor for measuring the state x$_3$ (denoted by y$_3$), the brake torque, then an additional residual function r$_3$ is obtained as:

$$r_3(u_k, y_k, \theta) = (y_3 + 50 \cdot D^2 \cdot \ddot{y}_2) + I \cdot (\ddot{y}_1) \quad (18)$$

Residual r$_2$ changes to:

$$r_2(u_k, y_k, \theta^2) = K \cdot \left(100 \cdot \tanh\left(\frac{y_1}{y_2} - 0.8\right)\right) + T_l(50 \cdot D^2 \cdot \ddot{y}_2 + I \cdot \ddot{y}_1) + (I \cdot \ddot{y}_1 + 50 \cdot D^2 \cdot \ddot{y}_2) \quad (19)$$

The residual r$_1$ remains unchanged. From (18) and (19), it is apparent that several improvements may be achieved through the inclusion of an additional sensor:

Estimation of parameter I is performed by the linear least-squares estimation method from (18). In the absence of the additional sensor, estimation of parameter I requires a nonlinear output-error parameter estimation method, a computationally expensive scheme.

Estimation of K and T$_l$ in residual r$_2$ reduces from a non-linear output-error parameter estimation (nonlinear) to an equation-error linear least-squares problem.

Because the parameter estimation method is reduced to an equation-error based linear least-squares problem, the fault detection and isolation are faster than in the system that included only two sensors.

5. Multi-signal Dependency Modeling

The D-matrix generated from test designs herein are shown in TABLE IV. In this table, parametric faults are related to the SIMULINK® blocks of the system.

TABLE IV

DIAGNOSTIC MATRIX FOR ABS

| SIMULINK BLOCK | Fault | Test |  |  |  |  |
|---|---|---|---|---|---|---|
|  |  | r1_test | r2_test | K_test | Tl_test | I_test |
| 1. Vehicle Diameter | F1 | 1 | 0 | 0 | 0 | 0 |
| 2. Force & Torque | F2 | 0 | 1 | 1 | 0 | 0 |
| 3. Hydraulic Lag | F3 | 0 | 1 | 0 | 1 | 0 |
| 4. Inertia | F4 | 0 | 1 | 0 | 0 | 1 |
| Blocks 2 & 4 | F5 | 0 | 1 | 1 | 0 | 1 |

Figure 7:
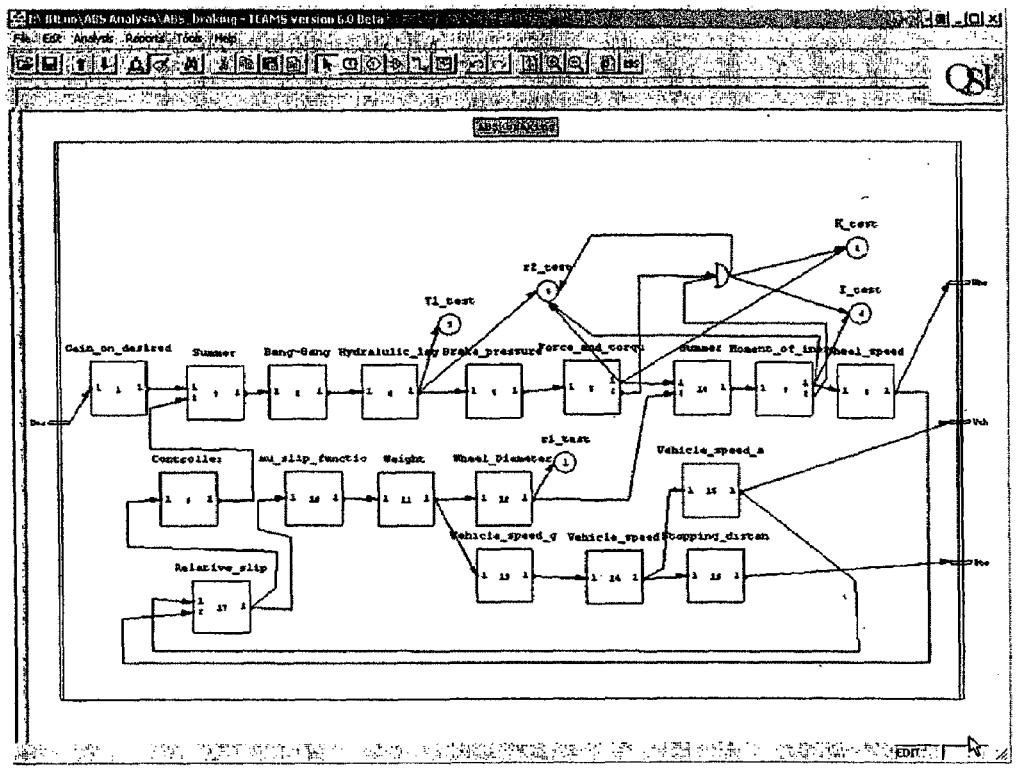
FIG. 7 is an exemplary multi-signal dependency model of an ABS system according to an exemplary embodiment of the present disclosure.

F1: 5% Changes in D
F2: 5% Changes in K
F3: 5% Changes in T$_l$
F4: 5% Changes in I
F5: 5% Changes in K and I
r1_test: Test on residual 1
r2_test: Test on residual 2
K_test: Statistical test on the estimate of K
T$_l$_test: Statistical test on the estimate of T$_l$
I_test: Statistical test on the estimate of I A multi-signal dependency model is extracted from the D-Matrix and the MATLAB/SIMULINK® model as shown in FIG. 7. The multi-signal dependency model follows the form of a SIMULINK block arrangement which makes it very easy to interpret. In this dependency model, only the SIMULINK blocks listed in Table IV are modeled and the others are assumed to be fault-free for ease of presentation.

Figure 8:
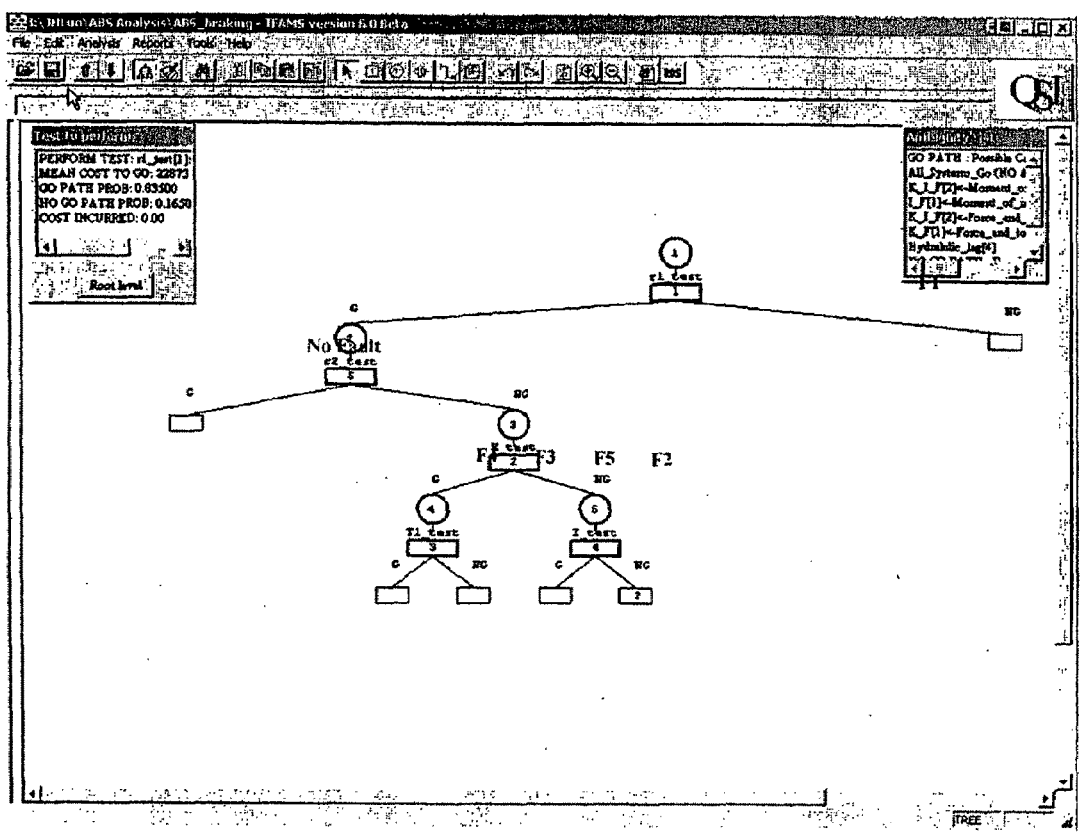
FIG. 8 is an exemplary schematic diagnostic tree for the ABS system according to the present disclosure.

A diagnostic tree, generated by testability analysis tool (such as TEAMS®), is shown in FIG. 8. It can be seen that all the parametric faults can be detected and isolated using the tests disclosed above.

Of note, to achieve real-time diagnostic inference, the software code for tests and the dependency model may be advantageously embedded in or otherwise associated with a real-time operating system. If the system is distributed, a distributed real-time inference engine may be employed, e.g., an engine using a TEAMS-RT® system can be deployed according to the present disclosure [29].

Thus, according to the present disclosure, a quantitative modeling environment (e.g. MATLAB/SIMULINK) provides significant advantages in terms of, inter alia, designing, modeling, simulating, testing and programming control strategies, for a host of applications, including specifically the automotive industry, aircraft systems, power systems, manufacturing systems, chemical processes and systems, transportation systems, and industrial machines/equipment. With the availability of mathematical models and computer-aided engineering information, intelligent model-based diagnostic systems and processes may be advantageously integrated into the initial design phase for such applications, e.g., to enhance vehicle health management. Stated differently, the availability of mathematical models and CAE information leads to or supports an ability to integrate model-based diagnostic process into the initial design phase.

Hybrid modeling, according to the present disclosure, offers accuracy of quantitative models coupled with computational efficiency and ease of use of graphical models for real-time diagnosis. Moreover, intelligent model-based diagnostic process(es) offer a systematic solution for a variety of applications, including vehicle health management.

According to exemplary embodiments of the present disclosure, the results of test designs from different model-based diagnostic schemes are layered onto a graph-based dependency model, which is more compact for real-time diagnostic implementation and easy to explain to maintenance technician(s). The intelligent model-based diagnostic process and system of the present disclosure provides a systematic solution for monitoring, diagnosing and maintaining systems, e.g., for addressing vehicle health management issues, ranging from model, test design, adaptive learning, diagnostic inference to prognostics.

In the exemplary ABS application described above, computational implementations, robustness to disturbance and noise, and fault detection measures for model-based test design are demonstrated. The hybrid model-based approach of the present disclosure effectively captures the essential results from model-based test design, exploits the existing validated knowledge on rule-based methods, and enables rapid remote diagnosis.

The systems and methods of the present disclosure are envisioned to have widespread application, including, inter alia, (i) application of the hybrid diagnostic process/system to a host of automotive systems beyond the brake system described herein (e.g., engine, power-train, clutch, etc.), (ii) implementation of the hybrid modeling approach for a variety of applications, and (iii) implementation of distributed real-time inference engines for use according to the disclosed systems and methods. Additional applications, implementations, modifications and/or enhancements will be apparent to persons skilled in the art based on the disclosure herein, and such additional applications, implementations modifications and/or enhancements are expressly embodied within the scope of the present disclosure.

Agent-Based Vehicle Health Management Architectures

Numerous issues routinely confront automobile owners, e.g., is the car's engine light on, has regular maintenance (such as oil change) been completed, etc.? The present disclosure effectively and advantageously addresses such issues by isolating failure sources, e.g., in a car, and providing decision support (or warning) messages, as appropriate, e.g., reminders for regular check-ups and monitoring of health status of components.

The system and method of the present disclosure operates by extracting failure cause-effect dependency model(s), which are extracted from behavioral simulation of the vehicle under faulty scenarios. Based on the dependency model, a subsystem-resident local agent (called ECU-agent) makes local diagnostic/prognostic decisions, while a vehicle-level agent (called Diagnostic ECU-agent) will fuse local decisions into a vehicle-level diagnosis. The vehicle-level agent coordinates the local agents, and communicates with a Central Facility (e.g., car dealer shop or manufacturing facility) on the diagnostic/prognostic results and, if necessary, transmits sensor data streams to the Central Facility for further diagnosis by a global agent. The prognostic results can also support car manufacturers in managing the health of a vehicle class (e.g. parts management, model update, recalls).

Figure 11:
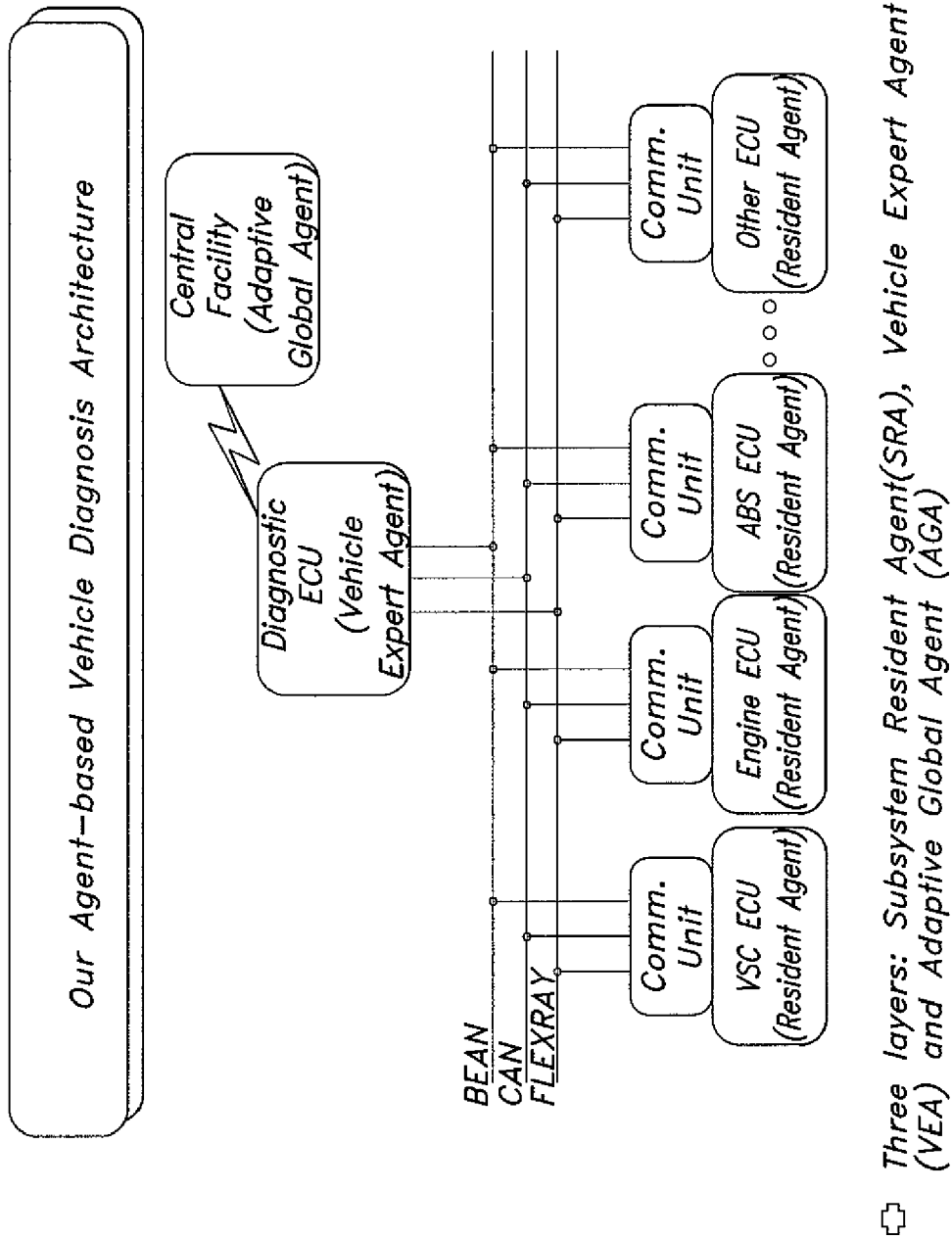
FIG. 11 is a schematic diagram of an exemplary vehicle diagnostic architecture for a multi-agent-based vehicle diagnostic system according to the present disclosure.

FIG. 11 shows an exemplary diagram of an intelligent multi-agent vehicle diagnostic architecture according to the present disclosure. Although this exemplary embodiment of the disclosure is directed to "vehicle diagnostics," the advantageous principles, features and functionalities of the disclosed multi-agent architecture apply to a wide range of applications. "Multi-agent diagnostics" as described herein has wide ranging applications beyond the automotive field, extending for, example, to the aircraft industry, power systems, manufacturing systems, chemical processes and systems, transportation systems, and industrial machines/equipment. Additional applications will be readily apparent to persons skilled in the art based on the disclosure herein.

With further reference to FIG. 11, there are three types of agents in the exemplary multi-agent diagnostic system: Subsystem (ECU)-Resident Agent, Expert Vehicle Agent and Adaptive Global Agent. The subsystem agents are typically resident in the ECUs, the diagnostic agent is located in a special Diagnostic ECU (DECU), while the adaptive global agent is situated in a Central Facility. The Communication Unit is generally located in each subsystem ECU and serves as a gateway to various ECUs and the DECU, and can be designed to accommodate one or more protocols (e.g., CAN, FlexRay, and Bean). Consequently, the ECUs can share sensor data and information (e.g., events, error codes). Real-time diagnostic inference and signal processing software are generally resident in ECUs. In exemplary embodiments of the present disclosure, the Diagnostic ECU has more computational power and is interfaced with the Navigation system for Human Computer Interface and a Hard Disk for data storage.

In the disclosed architecture, the monitored system is divided into domains (for each ECU) and the diagnostic inference tasks are distributed according to these domains. This architectural design can lead to the distribution of knowledge base and database(s) into the constituent resident agents as well. In addition, the distributed diagnostic architecture can significantly simplify knowledge abstraction efforts because only the knowledge for each domain (ECU) is required; for example, a model of a subsystem is easier/less demanding to obtain than the model of an entire vehicle.

Thus, in exemplary embodiments of the present disclosure, an open architecture is employed. The disclosed open architecture is flexible and extensible to support "plug-and-play" modules/components. Thus, new agents can be added by simply registering themselves with this agent platform. Similarly, other new components, such as the addition of new ECUs and smart sensors, can also be included and/or added to this architecture with a minimum amount of work.

Figure 12:
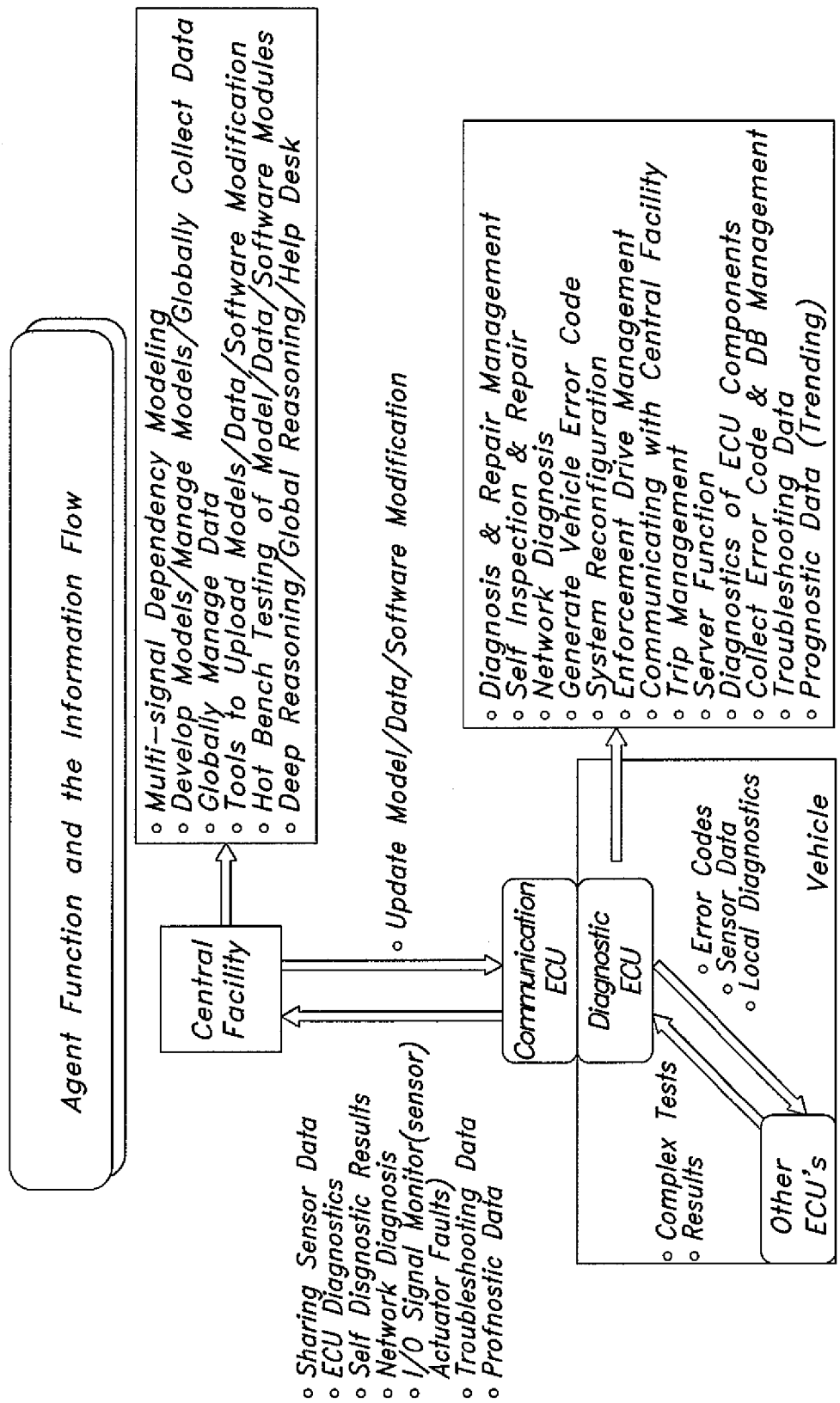
FIG. 12 is a schematic block diagram of information flow between and among agents according to an exemplary embodiment of the present disclosure.

FIG. 12 schematically illustrates exemplary functions of the agents and information flow among them in an embodiment disclosed architecture. Agent functions are described in greater detail herein below.

1. Subsystem-resident Agent (in ECU)

Due to the limited computational power and memory available at each ECU, the subsystem-resident agent is typically configured in one of the following three ways.

No Subsystem-Resident Agent at all

In exemplary embodiments of the present disclosure, this configuration benefits from taking advantage of developing the super-fast inference algorithms (managed by Vehicle Expert Agent) in the Diagnostic ECU. For an average of 50~70 failure modes in each ECU, and thus a total about 4000 failure modes, the Vehicle Expert Agent can compute the diagnostic inferences of the entire vehicle in real-time in the Diagnostic ECU.

Require Only Some Subsystem-Resident Agents

To reduce the computation and storage requirement of the Diagnostic ECU, this approach will locate Subsystem-Resident Agents in some simple ECUs. The Diagnostic ECU will collect the diagnostic results from these (few) Subsystem-Resident Agents and perform system-level diagnostics (by resolving ambiguity among the diagnostic conclusions from different ECUs).

Each ECU has its Own Subsystem-Resident Agent

This configuration minimizes the computation and storage requirements of the Diagnostic ECU and the amount of data flow between the Communication Unit of the Diagnostic ECU and the other ECUs' Communication Units.

Due to the memory limitations on ECUs, for some ECUs with complex tests and a large number of failure modes, partial testing and local inference can be embedded in the Subsystem-Resident Agent. More complex tests, which require significant computation and memory (e.g., vibration processing), may be performed in the Diagnostic ECU and the processed results will be transmitted to the ECU agent for local fault diagnosis. Therefore, the functions performed in the Subsystem-resident Agent will generally include:

(1). Sensor data acquisition and preprocessing
(2). Local diagnostics
(3). Receive Complex test results from the Diagnostic ECU.
(4). Receive commands and results of global diagnosis from the Diagnostic ECU.

2. Vehicle Expert Agent (in Diagnostic ECU)

Vehicle Expert Agent (VEA), which resides in the Diagnostic ECU, performs the diagnostic management functions of the entire vehicle. The major functions performed by this agent generally include:

(1) Self inspection and repair—This built-in-test function (e.g., memory test, boundary scan, and built-in-self-test) is generally supplied by the hardware manufacturer of the Diagnostic ECU (DECU).

(2) Network diagnosis—The DECU will continuously monitor the network (e.g., CAN, FlexRay) status. In case of network noise, breaking of wire and other network-related failures, the DECU will generate an error code to the Vehicle Expert Agent. The Vehicle Expert Agent has the capability to infer the failure location and take remedial actions (e.g., ignore data, recovery based on previously validated data).

(3) Generate the vehicle error code—While each ECU works within its own local domain knowledge, sometimes there is inconsistency and conflict among the diagnostic results of the Subsystem-Resident Agents. For example, a fault in one subsystem can propagate to other subsystems; the higher-level causal knowledge, such as the relationships among different subsystems and fault propagation patterns, can help the DECU agent to isolate the root cause. Based on the local diagnostic results from the ECUs (if Subsystem-Resident Agents are not required, the DECU agent will generate the diagnostic results for each ECU), the DECU will perform global inference (high-level decision making) and generate the vehicle error code. Since the diagnostic modeling (D-matrix) is comprehensive for the entire vehicle, ambiguous error codes (e.g., multiple failure codes in ECUs) can be resolved through this global inference mechanism.

(4) Reconfiguration—The DECU agent will perform reconfiguration based on the global diagnostic conclusions to minimize performance degradation, or at least provide a safe and predictable limp-home capability for the vehicle.

(5) Communication with Central facility—The DECU agent will communicate with the Communication ECU, and the Communication ECU will communicate with the Central Facility (or other cars) via a wireless network. The messages sent from DECU to Communication ECU generally include:

Sensor data
ECU diagnostics
Self diagnostics
Network diagnostics
I/O Signal Monitor (Sensor, actuator fault)
Troubleshooting data (case data, comments etc.)
Prognostic data (data trending)

(6) Trip management (scheduled and condition-based maintenance)—The DECU will produce advisory voice/text/graphical messages to the driver if scheduled maintenance (such as periodic oil change) or condition-based maintenance (based on the remaining life estimation), e.g., via a human friendly interface (such as the display of the navigation system). This data is also stored in the diagnostic server database in the hard drive of the DECU.

(7) Guided Troubleshooting Server Function—The DECU can function as a guided troubleshooting server to the driver or to a maintenance technician in the field. The major functions of this server are typically model management, diagnostic logs, parameter updates, scheduled maintenance output, and configuration management.

(8) Diagnostics of the ECU and subsystem components
(9) Collect error codes and database management
(10) Record Troubleshooting data
(11) Prognostics (data trending)

3. Adaptive Global Agent (at the Central Facility)

The Adaptive Global Agent resides in a Central Facility, and generally has the following functions:

(1) Diagnostic Modeling via Multi-Signal Dependency Modeling: Modeling is generally performed by experienced personnel at the Central Facility;

(2) Manage models, globally manage data and collect vehicle fleet data;

(3) Communicate with the Vehicle Expert Agent to update models, data and to modify software;

(4) Hot-bench testing of models: This function can be used to verify and validate models.

(5). Deep-reasoning (global reasoning)/help desk

Thus, according to the present disclosure, an adaptive intelligent hybrid model-based fault diagnosis system/method may be advantageously employed as part of a multi-agent diagnostic architecture. The hybrid modeling technique, which combines quantitative (Matlab/Simulink) modeling and graph-based dependency modeling, provides significant monitoring, diagnostic and maintenance advantages to system users. In addition, the disclosed system/method effectively addresses and manages the entire maintenance process, from test design, diagnostic merit evaluation, adaptive learning, intelligent inference, prognosis, and knowledge management.

The disclosed system/method can significantly shorten the diagnostic/prognostic development cycle. Concurrent design of diagnostics/prognostics and system architecture optimization with the system design advantageously reduces the time-to-market. Thus, the disclosed system/method is a useful tool for standardizing the test design process. In addition, since the test design can be performed concurrently with the system design, the same model can be built and tested with the new design. Consequently, only minor modifications will be needed as new models are brought on-line.

Compared to present technology, numerous advantages are immediately apparent with respect to the system/method of the present disclosure, including:

(a) High speed reasoning (fast algorithms)
(b) Small memory footprint (small memory requirements)
(c) Can track intermediate (transient) faults (since it is on-line)
(d) Detect incipient faults (can take pro-active maintenance, just-in-time maintenance)
(e) Top level agent can handle uncertainty (tests can be imperfect)
(f) Learn on line how good the test design is
(g) Adaptive learning process (model can be automatically updated through global learning)
(h) Diagnostic and FMEA knowledge management is concurrent with system design Prognostic Techniques Many industrial systems exhibit increasing wear and tear of equipment during operation [4']. For example, an automobile has many pieces of equipment, such as the engine, gear box and valves that exhibit various types of performance degradation due to erosion, friction, internal damage and cracks. Prognostics are viewed as an add-on capability to diagnosis; they assess the current health of a system and predict its remaining life based on features that capture the gradual degradation in the operational capabilities of a system. Prognostics are critical to improve safety, plan successful missions, schedule maintenance, reduce maintenance cost and down time [5']. Unlike fault diagnosis, prognosis is a relatively new area and became an important part of Condition-based Maintenance (CBM) of systems. Currently, there are many prognostic techniques; their usage must be tuned for each application. The prognostic methods can be classified as being associated with one or more of the following two approaches: data-driven and model-based [6']. Each of these approaches has its own advantages and disadvantages and, consequently they are often used in combination in many applications. The following overview of prognostic techniques and their applications is provided in the context of the advantageous systems and methods disclosed herein.

1. Data-Driven Prognostics

The data-driven approaches are derived directly from routinely monitored system operating data (e.g., calibration, calorimetric data, spectrometric data, power, vibration and acoustic signal, temperature, pressure, oil debris, currents, voltages). In many applications, measured input/output data is the major source for gaining a deeper understanding of the system degradation behavior. The data-driven approaches rely on the assumption that the statistical characteristics of data are relatively unchanged unless a malfunctioning event occurs in the system. That is, the common cause variations are entirely due to uncertainties and random noise, whereas special cause variations (e.g., due to degradations) account for data variations not attributed to common causes.

The data-driven approaches are based on statistical and learning techniques from the theory of pattern recognition. These range from multivariate statistical methods (e.g., static and dynamic principle components (PCA), linear and quadratic discriminants, partial least squares (PLS) and canonical variate analysis (CVA)), to black-box methods based on neural networks (e.g., probabilistic neural networks (PNN), decision trees, multi-layer perceptrons, radial basis functions and learning vector quantization (LVQ)), graphical models (Bayesian networks, hidden Markov models), self-organizing feature maps, signal analysis (filters, auto-regressive models, FFT, etc.) and fuzzy rule-based systems.

The research on data-driven approaches has focused on monitoring of signals related to system health. In one publication [7'], a prognostic process for transmission gears is proposed by modeling the vibration signal as a Gaussian mixture. By adaptively identifying and tracking the changes in the parameters of Gaussian mixture, it is possible to predict gear faults. Wang [8'] used an AR process to model a vibration signal for prognosis. However, the AR parameters (polynomial coefficients) have no physical meaning related to the monitored system. Zhang [9'] proposed a parameter estimation approach for a nonlinear model with temperature measurements of gas turbines.

The on-line detection procedure presented in [9'] can track small variations in parameters for early warning. In another publication [10'], a dynamic wavelet neural network (DWNN) was implemented to transform sensor data to the time evolution of a fault pattern and predict the remaining useful time of a bearing. The DWNN model was first trained by using vibration signals of defective bearings with varying depth and width of cracks, and then was used to predict the crack evolution until the final failure. Swanson [11'] proposed to use a Kalman filter to track the dynamics of the mode frequency of vibration signals in tensioned steel band (with seeded crack growth). In a further publication [12'], Garga proposed a signal analysis approach for prognostics of an industrial gearbox. The main features used included the root mean square (RMS) value, Kurtosis and Wavelet magnitude of vibration data. The strength of data-driven techniques is their ability to transform high-dimensional noisy data into lower dimensional information for diagnostic/prognostic decisions. The main drawback of data-driven approaches is that their efficacy is highly-dependent on the quantity and quality of system operational data. The data-driven approach is applicable to systems, where an understanding of first principles of system operation is not comprehensive.

2. Model-based Prognostics

The model-based methods generally assume that an accurate mathematical model is available. The model-based methods use residuals as features, where the residuals are the outcomes of consistency checks between the sensed measurements of a real system and the outputs of a mathematical model. The premise is that the residuals are large in the presence of malfunctions, and small in the presence of normal disturbances, noise and modeling errors. Statistical techniques are used to define thresholds to detect the presence of faults. The three main ways of generating the residuals are based on parameter estimation, observers (e.g., Kalman filters, reduced order unknown input observers, Interacting Multiple Models [13']) and parity relations.

The model-based approach is generally applicable in situations where accurate mathematical models can be constructed from first principles. Adams [14'] proposed to model damage accumulation in a structural dynamic system as first/second order nonlinear differential equations. Chelidze [15'] modeled degradation as a "slow-time" process, which is coupled with a "fast-time", observable subsystem. The model was used to track battery degradation (voltage) of a vibrating beam system. The main advantage of model-based approach is the ability to incorporate physical understanding of the system to monitoring. Another advantage is that, in many situations, the changes in feature vector are closely related to model parameters [16'].

Therefore, it can also establish a functional mapping between the drifting parameters and the selected prognostic features. Moreover, if understanding of the system degradation improves, the model can be adapted to increase its accuracy and to address subtle performance problems. Consequently, it can significantly outperform data-driven approaches. Accordingly, advantageous model-based prognostic techniques are disclosed by combining singular perturbation methods of control theory, coupled with dynamic state estimation techniques for damage prediction.

Unlike conventional maintenance strategies, prognostic techniques predict system degradation based on observed system condition to support "just-in-time" maintenance. The ever increasing usage of model-based design technology facilitates the integration of model-based diagnosis and prognosis of systems, leading to condition-based maintenance. Additional disclosure concerning advantageous prognostic systems and methods of the present disclosure are set forth in the following articles, which are hereby incorporated herein by reference in their entireties.

- Luo, J.; Namburu, M.; Pattipati, K. R.; Qiao, L.; Chigusa, S.; "Model-based Prognostic Techniques," Proceedings of IEEE AUTOTESTCON, ppl 330-340, Anaheim, Calif., Sep. 22-25, 2003 (referenced publications within the prognostic discussion are identified therein with a "prime" designation, e.g., 7'),
- Luo, J.; Bixby, A.; Pattipati, K. R.; Qiao, L.; Kawamoto, M.; Chigusa, S.; "An Interacting Multiple Model Approach to Model-based Prognostics," IEEE International Conference on SMC, Vol. 1, pp. 189-194, Washington, D.C., Oct. 5-8, 2003, and
- Jianhui Luo, Fang Tu, Mohammed S. Azam, Krishna R. Pattipati, Peter K. Willett, Liu Qiao, Masayuki Kawamoto, "Intelligent model-based diagnostics for vehicle health management," Proc. SPIE, Vol. 5107, pp. 13-26, April 2003.

In addition, the following publications are referenced in the present disclosure and incorporated herein by reference to the extent not inconsistent with the systems and methods disclosed herein:

1. P. Struss, B. Rehfus, R. Brignolo, F. Cascio, L. Console, P. Dague, P. Dubois, O. Dressler, and D. Millet, "Model-based tools for integration of design and diagnosis into a common process—a project report," 13*th International Workshop on Principles of Diagnosis* (DX02), Semmering, Austria, 2002.
2. Venkat Venkatasubramanian, Raghunathan Rengaswamy, Kewen Yin and Surya N. Kavuri, "A review of process fault detection and diagnosis: Part I: Quantitative model-based methods," *Computers & Chemical Engineering*, Vol. 27, pp. 293-311, 2003.
3. Silvio Simani, Cesare Fantuzzi and Ron J. Patton, *Model-based fault diagnosis in dynamic systems using identification techniques*, Springer Verlag publishers, 2003.
4. Ron J. Patton, Paul M. Frank and Rober N. Clark, *Issues of fault diagnosis for dynamic systems*, Springer Verlag publishers, 2000.
5. Isermann, R., "Process fault detection based on modeling and estimation methods: a survey," *Automatica*, Vol. 20, pp. 387-404, 1984.
6. Isermann, R., "Fault diagnosis of machines via parameter estimation and knowledge processing-tutorial paper," *Automatica*, Vol. 29, No. 4, pp. 815-835, 1993.
7. Isermann, R., "Supervision, fault-detection and fault-diagnosis methods—an introduction," *Control Eng. Practice*, Vol. 5, No. 5, pp. 639-652, 1997.
8. Paul M. Frank, "Fault diagnosis in dynamic systems using analytical and knowledge-based redundancy—a survey and some new result," *Automatica*, Vol. 26, No. 3, pp. 459-474, 1990.
9. Young, P. C., "Parameter estimation for continuous-time models—a survey," *Automatica*, Vol. 17, No. 23, 1981.
10. Qinghua Zhang, Michele Basseville and Albert Benveniste, "Fault detection and isolation in nonlinear dynamic systems: a combined input-output and local approach," *Automatica*, Vol. 34, No. 11, pp. 1359-1373, 1998.
11. Qinghua Zhang, M. Basseville and A. Benveniste, "Early warning of slight changes in systems," *Automatica*, Vol. 30, No. 1, pp. 95-115, 1994.
12. Shanggang Zhou and Douglas A. Wolfe, "On derivative estimation in spline regression," *Statistica Sinica*, Vol. 10, pp. 93-108, 2000.
13. Janos Gertler, Mark Constin, xiaowen Fang, Zdzislaw Kowalczuk, Moid Kunwer and Ramin Monajemy, "Model based diagnosis for automotive engines—algorithm development and testing on a production vehicle," *IEEE Tran. On Control Sys. Tech.*, Vol 3, No. 1, 1995.
14. "Using Simulink and Stateflow in automotive applications," Mathworks Technical Note.
15. "Automotive brake system," Rober Boshch Gmbh Publisher, 1995.
16. Yong-Wha Kim, Rizzoni, G., Utkin, V., "Automotive engine diagnosis and control via nonlinear estimation," *IEEE Control Systems Magazine*, Vol. 18, pp. 84-99, 1998.
17. R. Conatser, J. Wagner, S. Ganta and I. Walker, "Diagnosis of automotive electronic throttle control systems," *Control Engineering Practice*, In Press, Corrected Proof, 2003.
18. V. Krishnaswami, G.-C. Luh and G. Rizzoni, "Nonlinear parity equation based residual generation for diagnosis of automotive engine faults," *Control Eng. Practice*, Vol. 3, No. 10, pp. 1385-1392, 1995.
19. Janos J. Gertler and Ramin Monajmey, "Generating directional residuals with dynamic parity relations," *Automatica*, Vol. 33, No. 4, pp. 627-635, 1995.
20. J. Gertler, "Fault detection and isolation using parity relations," *Control Eng. Practice*, Vol. 5, No. 5, pp. 1385-1392, 1995.
21. V. Krishnaswami, G.-C. Luh and G. Rizzoni, "Nonlinear parity equation based residual generation for diagnosis of automotive engine faults," *Control Eng. Practice*, Vol. 3, No. 10, pp. 1385-1392, 1995.
22. Marcus Börner, Harald Straky, Thomas Weispfenning and Rolf Isermann, "Model based fault detection of vehicle suspension and hydraulic brake systems," *Mechatronics*, Vol. 12, Issue 8, pp. 999-1010, 2002.
23. T. Pfeufer, "Application of model-based fault detection and diagnosis to the quality assurance of an automotive actuator," *Control Engineering Practice*, Vol. 5, Issue 5, pp. 703-708, 1997.
24. Takajir Umeno, Katsuhiro Asano, Hideki Ohashi, Masahiro Yonetani, Toshiharu Naitou, "Observer based estimation of parameter variations and its application to tire pressure diagnosis," *Control Engineering Practice*, Vol. 9, pp. 639-645, 2001.
25. Lennart Ljung, *System identification: theory for the user*, Prentice-Hall, Inc, 1987.
26. Sujoy Sen, Sulakshana S. Nath, Venkata N. Malepati and Krishna R. Pattipati, "Simulation-based testability analysis and fault diagnosis," AUTOTESTCON '96, pp. 136-148, 1996.
27. Somnath Deb, Krishna R. Pattipati, Vijay Raghavan, Mojdeh Shakeri and Roshan Shrestha, "Multi-signal flow graphs: a novel approach for system testability analysis and fault diagnosis," *IEEE Aerospace and Electronics Systems Magazine*, Vol. 10, No. 5, pp. 14-25, 1995.
28. Fang Tu, Krishna Pattipati, Somnath Deb and Venkata Narayana Malepati, "Computationally efficient algorithms for multiple fault diagnosis in large graph-based aystems", *IEEE Transactions on SMC*, Vol. 33, No. 1, pp. 73-85, 2003.

29. Somnath Deb, Amit Mathur, Peter K. Willett, Krishna R. Pattipati, "De-centralized real-time monitoring and diagnosis," *IEEE International Conference on SMC*, Vol. 3, pp. 2998-3003, 1998.

The invention claimed is:

1. A diagnostic method for a system, comprising:
   (a) generating a hybrid quantitative and graphical dependency model that captures at least one fault-to-error characteristic for the system,
   (b) establishing at least one fault condition associated with the system;
   (c) running at least one test design on the hybrid quantitative and graphical dependency model for the system;
   (d) evaluating performance of the at least one test design with respect to the at least one fault condition using the hybrid quantitative and graphical dependency model to refine the hybrid quantitative and graphical dependency model for the system;
   (e) establishing one or more performance limits for the system based on the performance evaluation; and
   (f) effecting at least one remedial action based on the one or more performance limits, said at least one remedial action directly impacting upon operation of the system.

2. A diagnostic method according to claim 1, further comprising validating the hybrid quantitative and graphical dependency system model.

3. A diagnostic method according to claim 1, further comprising running at least one simulation on said hybrid quantitative and graphical dependency model to extract a relationship between a failure cause and an observable effect for the system.

4. A diagnostic method according to claim 1, further comprising generating a design matrix based on a plurality of test designs for a plurality of system faults.

5. A diagnostic method according to claim 4, wherein a subsystem-resident local agent functions as an electronic control unit for the system.

6. A diagnostic method according to claim 4, wherein said design matrix is accessed by a subsystem-resident local agent and wherein said subsystem-resident local agent is adapted to make local diagnostic or prognostic decisions with respect to said system based, at least in part, on said design matrix.

7. A diagnostic method according to claim 6, wherein said subsystem-resident local agent communicates with a system-level agent, and wherein said system-level agent is adapted to combine local decisions into a system-level diagnosis.

8. A diagnostic method according to claim 7, wherein said system-level agent is adapted to communicate diagnostic results to a central facility.

9. A diagnostic method according to claim 1, wherein information associated with said system model is stored in a database.

10. A diagnostic method according to claim 9, wherein said information is selected from the group consisting of model parameters, test specifications, simulation data and combinations thereof.

11. A diagnostic method according to claim 1, further comprising generating a directed graph model of the system based on the performance evaluation.

12. A diagnostic method according to claim 11, wherein at least one test is input to an electronic control unit associated with the system.

13. A diagnostic method according to claim 12, wherein said at least one test is adapted to respond to a fault in the system.

14. A diagnostic method according to claim 13, wherein said at least one test is adapted for online detection of a system fault.

15. A diagnostic method according to claim 1, wherein said system is selected from the group consisting of an automotive system, an aircraft system, a power system, a manufacturing system, a chemical system, a chemical process system, a transportation system, a machine system, and an equipment system.

16. A diagnostic method according to claim 1, wherein said system is an automotive system.

17. A diagnostic method for a system according to claim 1, wherein the at least one remedial action is undertaken in at least one of the following system stages: (i) modeling stage, (ii) test design stage, (iii) adaptive learning stage, (iv) diagnostic inference stage, and (v) prognostic stage.

18. A diagnostic system for providing diagnostics with respect to a system, comprising:
   (a) a plurality of subsystem-resident local agents in communication with said system, each of the subsystem-resident local agents being adapted to (i) make diagnostic determinations with respect to said system based, at least in part, on a design matrix, and (ii) implement at least one remedial action that directly impacts upon operation of the system based on said diagnostic determinations;
   (b) a system-level agent in communication with said plurality of subsystem-resident local agents, said system-level agent being adapted to combine diagnostic determinations by said plurality of subsystem-resident local agents;
   wherein said design matrix is established by:
     (i) generating a hybrid quantitative and graphical dependency model that captures at least one fault-to-error characteristic for the system,
     (ii) establishing at least one fault condition associated with the system,
     (iii) running at least one test design on the hybrid quantitative and graphical dependency model,
     (iv) evaluating performance of the at least one test design with respect to the at least one fault condition using the hybrid quantitative and graphical dependency model to refine the hybrid quantitative and graphical dependency model, and
     (v) establishing the design matrix based on the refined hybrid quantitative and graphical dependency model.

19. A diagnostic system according to claim 18, wherein the system-level agent is adapted to communicate diagnostic results to a central facility.

20. A diagnostic system according to claim 18, wherein said system is selected from the group consisting of an automotive system, an aircraft system, a power system, a manufacturing system, a chemical system, a chemical process system, a transportation system, a machine system, and an equipment system.

21. A diagnostic system according to claim 18, wherein the at least one remedial action is undertaken in at least one of the following system stages: (i) modeling stage, (ii) test design stage, (iii) adaptive learning stage, (iv) diagnostic inference stage, and (v) prognostic stage.

* * * * *